(12) United States Patent
Atsumi

(10) Patent No.: US 10,373,415 B2
(45) Date of Patent: Aug. 6, 2019

(54) USER IDENTIFICATION SYSTEM

(71) Applicant: Toyota Jidosha Kabushiki Kaisha, Toyota-shi, Aichi-ken (JP)

(72) Inventor: Ryuta Atsumi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 6 days.

(21) Appl. No.: 15/694,194

(22) Filed: Sep. 1, 2017

(65) Prior Publication Data

US 2018/0068510 A1 Mar. 8, 2018

(30) Foreign Application Priority Data

Sep. 7, 2016 (JP) .................................. 2016-174860

(51) Int. Cl.
*G07C 1/32* (2006.01)
*G07C 9/00* (2006.01)
*B60R 25/00* (2013.01)
*B60R 25/25* (2013.01)

(52) U.S. Cl.
CPC ........ *G07C 9/00563* (2013.01); *B60R 25/002* (2013.01); *B60R 25/25* (2013.01); *G07C 1/32* (2013.01); *G07C 9/00119* (2013.01); *G07C 9/00309* (2013.01); *G07C 2009/00373* (2013.01); *G07C 2009/00547* (2013.01); *G07C 2009/00769* (2013.01); *G07C 2009/00793* (2013.01); *G07C 2209/04* (2013.01)

(58) Field of Classification Search
None
See application file for complete search history.

(56) References Cited

U.S. PATENT DOCUMENTS

| 9,875,592 B1* | 1/2018 | Erickson ............ G07C 9/00309 |
| 2015/0009010 A1* | 1/2015 | Biemer .................... G06F 21/32 |
| | | 340/5.83 |
| 2015/0205957 A1* | 7/2015 | Turgeman ............. G06F 21/554 |
| | | 726/23 |
| 2017/0046800 A1* | 2/2017 | Zomet .................... G06Q 50/12 |

FOREIGN PATENT DOCUMENTS

JP 2001-351047 A 12/2001

* cited by examiner

*Primary Examiner* — Carlos Garcia
(74) *Attorney, Agent, or Firm* — Dinsmore & Shohl LLP

(57) ABSTRACT

A user identification system includes: a detection unit that detects prescribed motions of a person when the person boards or alights from a vehicle; an acquisition unit that acquires types of boarding information indicating that one of users boards or is on board the vehicle when one of the motions is detected; a memory that stores association information in which identification information of the users is associated with the types of boarding information corresponding to the users; a probability calculating unit configured to calculate a probability that each of the users boards or is on boarded the vehicle based on the types of boarding information and the association information; and an identification unit that identifies a user who boards or is on boarded the vehicle among the users based on the probability calculated by the probability calculating unit.

8 Claims, 14 Drawing Sheets

| USER | | | | BOARDING DISPLAY INFORMATION | | | | |
|---|---|---|---|---|---|---|---|---|
| | KEY ID | BT ADDRESS | FACE IMAGE | IDENTIFICATION OPERATION | N/R | N/R | ... |
| USER A | XXXXXX | AAAAAA | α | SELECTION A | N/R | N/R | ... |
| USER B | XXXXXX | BBBBBB | β | SELECTION B | N/R | N/R | ... |
| USER C | YYYYYY | CCCCCC | γ | SELECTION C | N/R | N/R | ... |
| N/R | N/R | N/R | N/R | N/R | N/R | N/R | ... |
| N/R | N/A | N/R | N/R | ... | ... | ... | ... |
| ... | ... | ... | ... | ... | ... | ... | ... |

FIG. 5

| 7052 | SMART KEY (KEY ID) | PORTABLE TERMINAL (BT ADDRESS) | FACE AUTHENTICATION (FACE IMAGE) | IDENTIFICATION OPERATION | BOARDING HISTORY | | |
|---|---|---|---|---|---|---|---|
| WF | 20% | 30% | 35% | 35% | 10% | N/R | N/R |
| | | | | | | N/R | N/R |
| | | | | | | ... | ... |

7053

| | | SEAT | VEHICLE-INSIDE FLAG | BOARDING PROBABILITY |
|---|---|---|---|---|
| USER | USER A | D SEAT | 1 | 50% |
| | USER B | P SEAT | 1 | 50% |
| | USER C | — | 0 | 30% |
| | N/R | N/A | N/A | N/A |
| | N/R | N/A | N/A | N/A |
| | ⋮ | ⋮ | ⋮ | ⋮ |

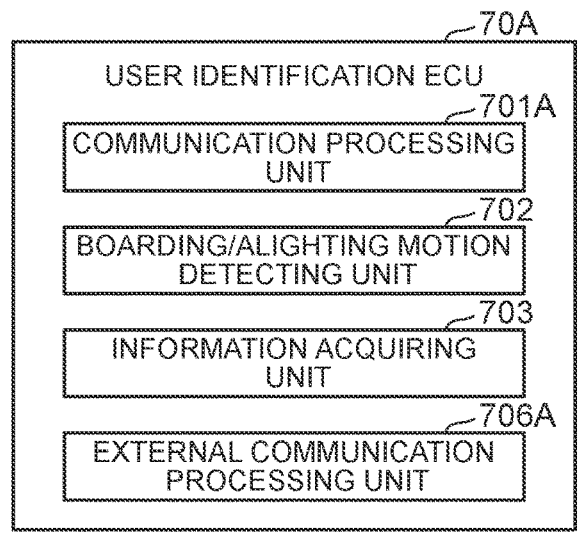
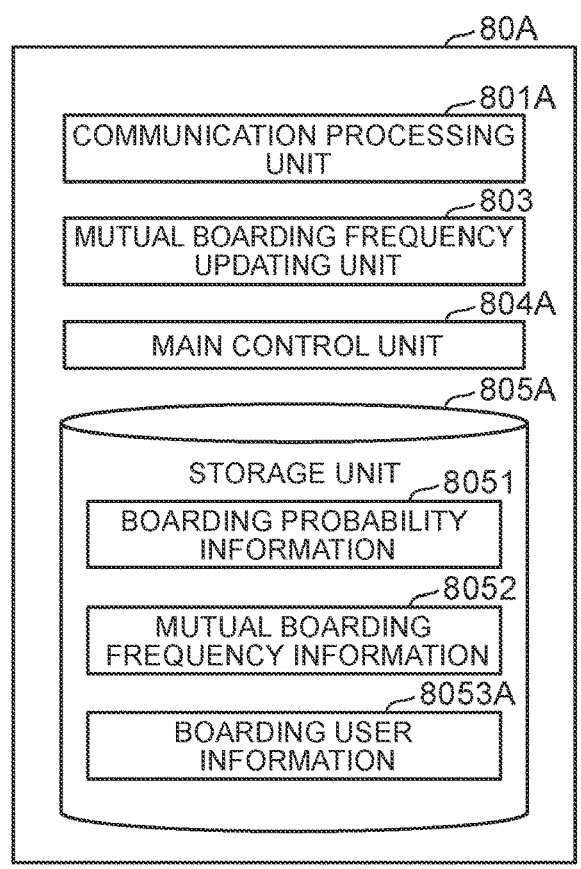

USER IDENTIFICATION SYSTEM

CROSS-REFERENCE TO RELATED APPLICATIONS

This application claims priority to Japanese Patent Application No. 2016-174860 filed on Sep. 7, 2016, which is incorporated herein by reference in its entirety including the specification, drawings and abstract.

BACKGROUND

1. Technical Field

The disclosure relates to a user identification system. Particularly, the disclosure relates to a user identification system that identifies a user who boards or is on board a vehicle.

2. Description of Related Art

A individual authentication technique of comparing a plurality of types of information (attributes) which are provided from individual authentication target persons with comparison reference data corresponding to the plurality of types of information and identifying a person is known (for example, see Japanese Patent Application Publication No. 2001-351047 (JP 2001-351047 A)).

SUMMARY

It is conceivable that a user who boards (is going to board) or is on board (has boarded) a vehicle is identified and various on-board devices (for example, an air-conditioning device and a seat position adjusting device) which are mounted in the vehicle are controlled depending on the user's taste, body type, and the like.

However, there may be a case that the configuration in which a plurality of types of information are provided from a user as in the above-mentioned individual authentication when the user boards a vehicle is not be able to realized. Since types of information capable of identifying a user who is going to board or has boarded a vehicle are limited in information acquired from one scene corresponding to a motion (a motion of approaching the vehicle, a motion of opening a door, or the like) when the user boards the vehicle, there is concern that accuracy will not be satisfactorily secured in the configuration in which a user is identified based on information acquired from a specific scene as in the individual authentication.

The disclosure provides a user identification system that can improve accuracy in identifying a user who is going to board or has boarded a vehicle.

A user identification system according to an aspect of the present disclosure includes: a sensor configured to detect a plurality of prescribed motions as motions of a person when the person performs at least one of boarding and alighting from a vehicle; an acquisition unit configured to acquire a plurality of types of boarding information indicating that one of a plurality of users registered in the vehicle in advance boards or is on board the vehicle when one of the plurality of motions is detected; a memory configured to store association information in which identification information corresponding to the plurality of users is associated with the plurality of types of boarding information corresponding to the plurality of users; a probability calculating unit configured to calculate a probability that each of the plurality of users boards or is on board the vehicle based on the plurality of types of boarding information and the association information; and an identification unit configured to identify a user who boards or is on board the vehicle among the plurality of users based on the probability calculated by the probability calculating unit.

According to the above aspect, a probability that each of the users is going to board or has boarded the vehicle is calculated whenever a plurality of prescribed motions of a user are detected when the user performs at least one of boarding and alighting from the vehicle. In generally, when occupants in a vehicle change, at least one of boarding and alighting from the vehicle is performed by a user. For example, when a user boards a parked vehicle, a series of motions such as a motion of approaching the vehicle, a motion of unlocking a door, a motion of opening a door, a motion of taking a seat, and a motion of closing a door are performed. When a user who has been transferred to a specific place by a car which is driven by another user alights from the vehicle, a series of motions such as a motion of opening a door, a motion of leaving a seat (a motion of standing up from a seat), a motion of closing a door, and a motion of leaving the vehicle are performed. Accordingly, whenever each of a plurality of prescribed motions among a series of motions which are necessarily performed is performed at the time of boarding or alighting from a vehicle, a probability that each of the users is going to board or has boarded the vehicle can be sequentially updated by calculating a probability that each of the users is going to board or has boarded the vehicle. As a result, when at least one of boarding and alighting from the vehicle is performed, it is possible to provide a plurality of opportunities to identify a user based on the probability which is sequentially updated and to improve accuracy in identifying a user who is going to board or has boarded a vehicle.

In the above aspect, the plurality of types of boarding information may include a first type of boarding information which is acquired to correspond to one of a plurality of seats in the vehicle, and the identification unit may identify a seat of the user who boards or is on board the vehicle among the plurality of seats based on the first type of boarding information acquired by the acquisition unit.

According to this configuration, boarding information indicating that one of a plurality of users which are registered in the vehicle in advance is going to board or has boarded the vehicle includes the first type of boarding information which is acquired to correspond to a plurality of seats (for example, a driver seat, a passenger seat, and a back seat) in the vehicle. The first type of boarding information may include, for example, information of a detection signal which is detected by sensors of the same type arranged for the seats. Accordingly, the user identification system (the identification unit) can identify on what seat a user who is going to board or has boarded is going to sit or has sat based on the first type of boarding information.

In the above aspect, the user identification system may further include a locking-unlocking unit configured to lock and unlock a door of the vehicle. The plurality of users may include a first user and a second user who has been set to be permitted to board the vehicle along with the first user in advance, and the locking-unlocking unit may be configured to unlock a door of the vehicle when the first user is identified as a user who is on board the vehicle by the identification unit, the second user is identified as a user who boards the vehicle by the identification unit in a state in which all doors of the vehicle are locked, and a predetermined operation on the vehicle is performed from outside of the vehicle.

According to this configuration, when the second user (for example, a family member or a close friend of the first user) who has been set to be permitted to board the vehicle along with the first user in advance is identified as the user who is going to board the vehicle and a predetermined operation on the vehicle from outside of the vehicle, for example, an operation of grasping a door handle, an operation of pushing a switch of a door handle, or an operation on a portable terminal for transmitting a signal for requesting to unlock the vehicle, is performed, it is possible to unlock a door without causing the first user to perform an unlocking operation and to allow the second user to board the vehicle, thereby improving convenience for the first user. Even when the second user is not carrying a smart key, the second user can unlock the vehicle by simply performing a predetermined operation on the vehicle from outside of the vehicle, thereby improving convenience for the second user. Since the first user can keep the doors of the vehicle in a locked state while waiting for the second user, it is possible to protect himself or herself from intrusion of a malicious third party into the vehicle. That is, it is possible to achieve coexistence of security and convenience.

In the aspect, the user identification system may further include: a mutual boarding frequency counting unit configured to count a mutual boarding frequency of each pair of the plurality of users based on an identification result of the identification unit; and a locking-unlocking unit configured to lock and unlock a door of the vehicle. The plurality of users may include a first user and a second user, the mutual boarding frequency of the second user with the first user being equal to or greater than a predetermined frequency, and the locking-unlocking unit may be configured to unlock the door of the vehicle when the first user is identified as a user who is on board the vehicle by the identification unit, the second user is identified as a user who boards the vehicle by the identification unit in a state in which all doors of the vehicle are locked, and a predetermined operation on the vehicle is performed from outside of the vehicle.

According to this configuration, when the second user (for example, a family member or a close friend of the first user) whose the mutual boarding frequency with respect to the first user is equal to or greater than a predetermined frequency is identified as the user who is going to board the vehicle and a predetermined operation on the vehicle from outside of the vehicle, for example, an operation of grasping a door handle, an operation of pushing a switch of a door handle, or an operation on a portable terminal for transmitting a signal for requesting to unlock the vehicle, is performed, it is possible to unlock a door without causing the first user to perform an unlocking operation and to allow the second user to board the vehicle, thereby improving convenience for the first user. Even when the second user is not carrying a smart key, the second user can unlock the vehicle by simply performing a predetermined operation on the vehicle from outside of the vehicle, thereby improving convenience for the second user. Since the first user can keep the doors of the vehicle in a locked state while waiting for the second user, it is possible to protect himself or herself from intrusion of a malicious third party into the vehicle. That is, it is possible to achieve coexistence of security and convenience.

In the aspect, the locking-unlocking unit may be configured to unlock only the door which is opened by the second user.

According to this configuration, since only a door which is to be opened by the second user is unlocked, it is possible to further improve security.

In the aspect, the user identification system may further include a control unit configured to control an on-board device mounted in the vehicle based on a control condition set in advance to correspond to the user identified by the identification unit among the plurality of users.

According to this configuration, it is possible to control on-board devices depending on a body type, a taste, and the like of a user who is going to board or has boarded the vehicle.

In the aspect, the user identification system may be mounted in the vehicle.

According to this configuration, the user identification system can identify a user who is going to board or has boarded a vehicle (a vehicle of interest) in which the user identification system is mounted.

In the aspect, the storage unit, the memory, the probability calculating unit, and the identification unit may be disposed remotely from the vehicle and configured to communicate with the vehicle According to this configuration, for example, a center server which is disposed remotely from the vehicle can identify a user who is going to board or has boarded the vehicle.

According to the aspect of the disclosure, it is possible to provide a user identification system that can improve accuracy in identifying a user who is going to board or has boarded a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating an example of profile information;

FIG. 5 is a diagram illustrating an example of boarding probability information;

FIG. 14 is a functional block diagram illustrating an example of a configuration of a user identification ECU according to the second embodiment;

FIG. 15 is a functional block diagram illustrating an example of a configuration of an on-board device ECU according to the second embodiment.

DETAILED DESCRIPTION OF EMBODIMENTS

Hereinafter, embodiments of the present disclosure will be described with reference to the accompanying drawings.

First Embodiment

First, a configuration of a user identification system 1 according to a first embodiment will be described with reference to FIGS. 1 to 6.

Figure 1:
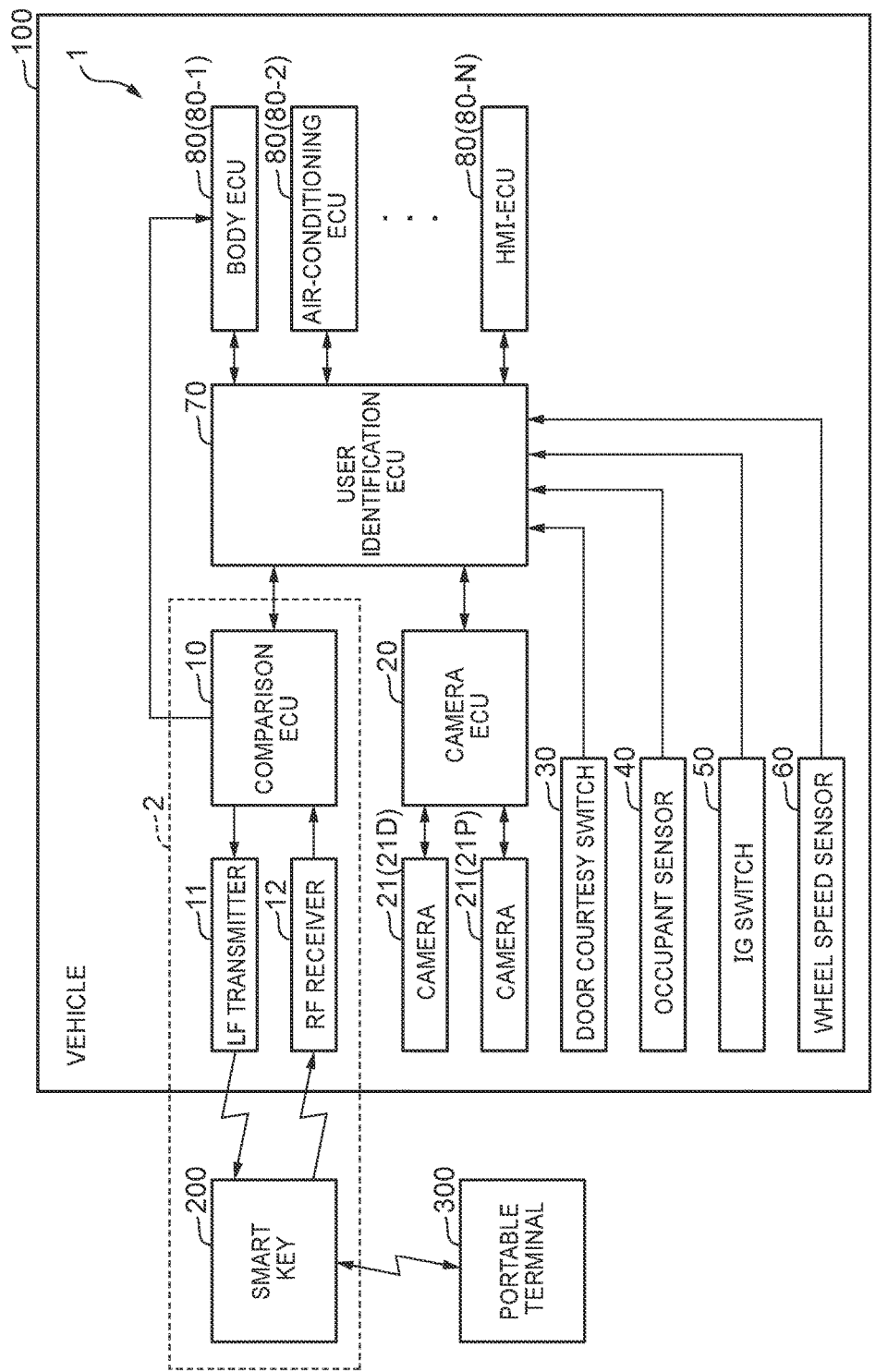
FIG. 1 is a diagram schematically illustrating an example of a configuration of a user identification system according to a first embodiment.

FIG. 1 is a block diagram schematically illustrating an example of a configuration of the user identification system 1. The user identification system 1 is mounted in a vehicle 100 and identifies a user who is going to board or has boarded the vehicle 100 among a plurality of users who have been registered in advance in the vehicle 100 (specifically, an internal memory of a user identification ECU 70 or an on-board device ECU 80 which will be described later, or the like)

In this embodiment, a "user who is going to board the vehicle 100" refers to a user who has not boarded the vehicle 100 yet and who is going to board the vehicle 100, and a "user who has boarded the vehicle 100" refers to a user who has actually boarded the vehicle 100.

The user identification system 1 includes a comparison electronic control unit (ECU) 10, an LF transmitter 11, an RF receiver 12, a camera ECU 20, a camera 21, a door courtesy switch 30, an occupant sensor 40, an IG switch 50, a wheel speed sensor 60, a user identification ECU 70, and an on-board device ECU 80.

The comparison ECU 10 along with the LF transmitter 11 and the RF receiver 12 is included in a smart key system 2.

In the smart key system 2, a smart key 200 is authenticated based on directional communication between the smart key 200 which has been registered in advance in the vehicle 100 (the comparison ECU 10) and which is carried by a user and the vehicle 100 (the comparison ECU 10) and a smart entry function based on the authentication result is realized. The smart entry function includes a function of locking or unlocking a door simply due to a user touching a door handle or pushing a trigger switch of a door handle with the smart key 200 carried, a function of turning on the ignition of the vehicle simply by allowing a user to push a predetermined button inside the vehicle with the smart key 200 being carried, and the like.

The number of smart keys 200 which are registered in advance in the vehicle 100 (the comparison ECU 10) may be one or two or more.

The smart key 200 can mutually communicate with a portable terminal 300 (for example, a mobile phone, a smart phone, or a tablet terminal) which is carried by a user of the vehicle 100 using a predetermined short-range communication unit, for example, using Bluetooth (registered trademark) communication or near field communication (NFC) communication. The smart key 200 and the portable terminal 300 are subjected to a pairing process in advance, and the smart key 200 is automatically connected to the portable terminal 300 in a communicable manner when the portable terminal 300 is present in a communication area of the predetermined short-range communication unit. That is, attribute information of the portable terminal 300, for example, a Bluetooth address (BT address) which will be described later, is registered in advance in the smart key 200.

The number of portable terminals 300 of which the attribute information is registered in advance in the smart key 200 may be one or two or more.

Hereinafter, functional configurations of the smart key system 2 and the portable terminal 300 will be described with reference to FIG. 2.

Figure 2:
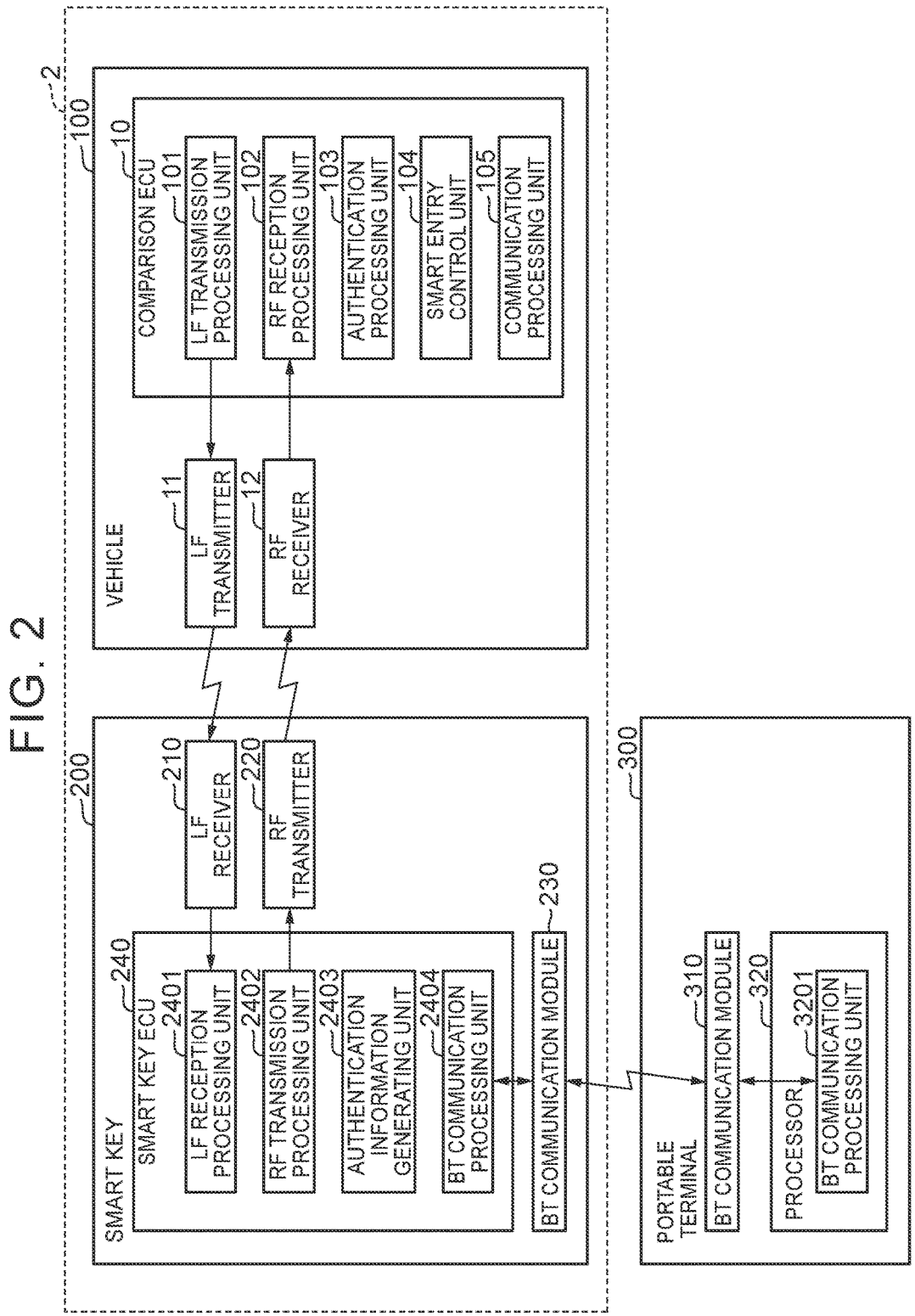
FIG. 2 is a functional block diagram illustrating an example of configurations of a smart key system including a comparison ECU and a smart key and a portable terminal according to the first embodiment.

FIG. 2 is a functional block diagram illustrating an example of configurations of the smart key system 2 including the comparison ECU 10 and the smart key 200 and the portable terminal 300.

The smart key system 2 includes the comparison ECU 10, the LF transmitter 11, the RF receiver 12, and the smart key 200 as described above.

The comparison ECU 10 is an electronic control unit that detects the smart key 200 which is registered in advance in the vehicle 100 (specifically, the comparison ECU 10) based on a signal (a response signal which will be described later) which is transmitted from the smart key 200. The function of the comparison ECU 10 may be embodied by arbitrary hardware, software, or a combination thereof and the comparison ECU 10 is mainly constituted, for example, by a microcomputer including a CPU, a RAM, a ROM, and an I/O. The comparison ECU 10 is, for example, a functional unit which is embodied by causing the CPU to execute one or more programs stored in the ROM, and includes an LF transmission processing unit 101, an RF reception processing unit 102, an authentication processing unit 103, a smart entry control unit 104, and a communication processing unit 105.

The LF transmission processing unit 101 controls the LF transmitter 11 and performs a process of transmitting radio waves of a low frequency (LF) band (for example, radio waves of 30 kHz to 300 kHz) to inside and outside of the vehicle. For example, the LF transmission processing unit 101 periodically transmits a wake-up signal (a polling signal) from the LF transmitter 11 to the smart key 200 at a prescribed time, for example, in a period in which ignition of the vehicle 100 is turned off (IG-OFF). For example, the LF transmission processing unit 101 transmits the wake-up signal from the LF transmitter 11 to the smart key 200 in response to a transmission command from the user identification ECU 70. The wake-up signal is a signal for waking up the smart key 200. For example, the LF transmission processing unit 101 transmits a request signal (for example, a challenge signal which will be described later) from the LF transmitter 11 to the smart key 200 in response to a transmission request from the authentication processing unit 103. For example, the LF transmission processing unit 101 transmits a connection state request signal from the LF transmitter 11 to the smart key 200 in response to a transmission command from the user identification ECU 70. The connection state request signal is a signal for requesting to return a response of a connection state between the smart key 200 and the portable terminal 300 and is specifically a signal for requesting to return attribute information (for example, a BT address) of the portable terminal 300 which is connected to the smart key 200.

The RF reception processing unit 102 controls the RF receiver 12 and performs a process of receiving radio waves of a radio frequency (RF) band (for example, radio waves of 30 MHz to 3 GHz). For example, the RF reception processing unit 102 receives a return signal which is transmitted from the smart key 200 having received the wake-up signal. For example, the RF reception processing unit 102 receives a signal (a response signal which will be described later) which is transmitted from the smart key 200 having received the request signal. For example, the RF reception processing unit 102 receives a connection state signal which is transmitted from the smart key 200 having received the connection state request signal. The connection state signal includes the presence or absence of the portable terminal 300 which is connected to the smart key 200 and attribute information (the BT address) of the portable terminal 300 which is connected to the smart key 200.

When the RF reception processing unit 102 receives a return signal from the smart key 200, the authentication processing unit 103 performs a process of authenticating the authenticity of the smart key 200 (hereinafter simply referred to as an authentication process). As the method of authenticating the authenticity of the smart key 200, for example, an arbitrary method such as comparison of an identifier (ID) specific to the smart key 200, challenge response authentication, or a combination thereof is employed. In the case of challenge response authentication, the authentication processing unit 103 generates an encryption code (a so-called "challenge") which can be decrypted using an encryption key which is set to be specific to the smart key 200 and sends a transmission request to the LF transmission processing unit 101. Accordingly, the LF transmission processing unit 101 performs the process of transmitting the challenge signal from the LF transmitter 11 to the smart key 200 as described above. When the challenge signal is received, the smart key 200 transmits a signal (hereinafter referred to as a "response signal") including the decryption result (a so-called "response") of the encryption code included in the challenge signal to the vehicle 100 (the comparison ECU 10). The authentication processing unit 103 compares the "response" with the decryption result of the "challenge" using the encryption key, and authenticates the authenticity of the smart key 200 (authentication success) when both match each other. That is, the authentication processing unit 103 can detect that the smart key 200 is present inside or outside the vehicle when authentication of the smart key 200 succeeds.

The smart entry control unit 104 performs control (smart entry control) of embodying the above-mentioned smart entry function based on the result of authenticating the smart key 200 by the authentication processing unit 103. For example, when an operation of grasping a door handle or the like is performed after the authentication of the smart key 200 by the authentication processing unit 103 succeeds, the smart entry control unit 104 transmits a transmission request signal for requesting to lock or unlock of a door of the vehicle 100 to the communication processing unit 105. Accordingly, the communication processing unit 105 transmits the signal to a body ECU 80-1 which will be described later, and the body ECU 80-1 controls a locking-unlocking device (not illustrated) such that the door of the vehicle 100 is locked or unlocked when the signal is received.

The communication processing unit 105 performs a process of transmitting and receiving signals to and from various ECUs (for example, the user identification ECU 70 and the on-board device ECU 80) which are connected to each other in a communicable manner via an on-board network such as a controller area network (CAN). For example, the communication processing unit 105 transmits a signal for requesting to lock or unlock a door to the body ECU 80-1 in response to the transmission request from the smart entry control unit 104 as described above. For example, the communication processing unit 105 receives a transmission command transmitted from the user identification ECU 70. The communication processing unit 105 transmits key detection information including a detection state of the smart key 200 and attribute information of the detected smart key 200, for example, the above-mentioned ID (hereinafter referred to as "key ID"), based on the wake-up signal (the polling signal) which is transmitted at a prescribed time from the LF transmission processing unit 101, to the user identification ECU 70. For example, the communication processing unit 105 transmits the key detection information including the detection state of the smart key 200 and the attribute information (a key ID) of the detected smart key 200 based on the wake-up signal, which is transmitted from the LF transmission processing unit 101 in response to the transmission command from the user identification ECU 70, to the user identification ECU 70. For example, the communication processing unit 105 transmits (sends) a connection state signal, which is received from the smart key 200 by the RF reception processing unit 102, to the user identification ECU 70.

The LF transmitter 11 transmits radio waves of an LF band to inside and outside of the vehicle under the control of the comparison ECU 10 (the LF transmission processing unit 101). The LF transmitter 11 transmits radio waves with an intensity which cannot be detected when the smart key 200 leaves the vicinity of the vehicle 100 (for example, a range in which a distance from the LF transmitter 11 is less than several m). Accordingly, the comparison ECU 10 (the authentication processing unit 103) can detect the smart key 200 which approaches the vehicle 100 or the smart key 200 which leaves the vehicle 100.

For example, an LF transmitter 11 which transmits LF radio waves to inside of the vehicle and an LF transmitter 11 which transmits radio waves of an LF band to outside of the vehicle may be provided. Accordingly, the comparison ECU 10 (the authentication processing unit 103) can determine whether the detected smart key 200 is present inside the vehicle or outside the vehicle. A plurality of LF transmitters 11 corresponding to the doors may be provided as the LF transmitters 11 that transmit radio waves of an LF band to outside of the vehicle. Accordingly, the comparison ECU 10 (the authentication processing unit 103) can determine which door of the doors provided in the vehicle 100 the smart key 200 is present in the vicinity of.

The RF receiver 12 receives radio waves of an RF band under the control of the comparison ECU 10 (the RF reception processing unit 102).

The smart key 200 includes an LF receiver 210, an RF transmitter 220, a Bluetooth communication module (a BT communication module) 230, and a smart key ECU 240.

The LF receiver 210 receives radio waves of an LF band under the control of the smart key ECU 240 (an LF reception processing unit 2401 which will be described later).

The RF transmitter 220 transits radio waves of an RF band under the control of the smart key ECU 240 (an RF transmission processing unit 2402 which will be described later).

The BT communication module 230 is an example of a communication device that performs short-range communication with the portable terminal 300. The BT communication module 230 is connected to the portable terminal 300 in a communicable manner by Bluetooth communication under the control of the smart key ECU 240 (a BT communication processing unit 2404 which will be described later). Hereinafter, it is assumed that the BT communication module 230 has a multipoint capability (a function of simultaneously communicating with a plurality of Bluetooth devices which have been paired). It is assumed that the BT communication module 230 is connected to the portable terminal 300 (a BT communication module 310 which will be described later) in a Bluetooth communicable manner by automatic pairing.

The smart key ECU 240 is an electronic control unit that performs various control processes in the smart key 200. The function of the smart key ECU 240 may be embodied by arbitrary hardware, software, or a combination thereof and the smart key ECU 240 is mainly constituted, for example, by a microcomputer including a CPU, a RAM, a ROM, and an I/O. The smart key ECU 240 is, for example, a functional unit which is embodied by causing the CPU to execute one or more programs stored in the ROM, and includes an LF reception processing unit 2401, an RF transmission processing unit 2402, an authentication information generating unit 2403, and a BT communication processing unit 2404.

The LF reception processing unit 2401 controls the LF receiver 210 and performs a process of receiving radio waves of an LF band. For example, the LF reception processing unit 2401 receives a wake-up signal, a request signal (a challenge signal), a connection state request signal, and the like which are transmitted from the vehicle 100 (the comparison ECU 10).

The smart key ECU 240 is generally in a sleep state in which functions other than a function (that is, the LF reception processing unit 2401) of receiving radio waves of an LF band are stopped, and the other functions are woken up by a wake-up signal which is received by the LF reception processing unit 2401.

The RF transmission processing unit 2402 controls the RF transmitter 220 and performs a process of transmitting radio waves of an RF band to outside. For example, when the LF reception processing unit 2401 receives a wake-up signal, the RF transmission processing unit 2402 transmits a return signal indicating the reception of the wake-up signal to the vehicle 100 (the comparison ECU 10). For example, the RF transmission processing unit 2402 transmits a response signal to the vehicle 100 (the comparison ECU 10) in response to a transmission request from the authentication information generating unit 2403. For example, when the LF reception processing unit 2401 receives a connection state request signal, the RF transmission processing unit 2402 transmits a connection state signal indicating a connection state with respect to the portable terminal 300 which is registered in advance in the smart key 200 (the smart key ECU 240) to the vehicle 100 (the comparison ECU 10).

The connection state signal includes attribute information (a BT address) of the portable terminal 300 which is connected to the smart key 200 (the BT communication module 230) as described above.

When the LF reception processing unit 2401 receives a request signal (a challenge signal), the authentication information generating unit 2403 generates information (authentication information) which is necessary for the authentication process by the comparison ECU 10. For example, the authentication information generating unit 2403 generates a decryption result (a response) of an encryption code included in the challenge signal as the authentication information as described above, and sends a transmission request of a response signal including the decryption result to the RF transmission processing unit 2402.

The BT communication processing unit 2404 controls the BT communication module 230 and performs a connection process to the portable terminal 300 (the BT communication module 310) which is registered in advance by Bluetooth communication.

The portable terminal 300 includes a BT communication module 310 and a processor 320.

The BT communication module 310 is connected to the smart key 200 (the BT communication module 230) in a communicable manner by Bluetooth communication under the control of the processor 320 (a BT communication processing unit 3201 which will be described later).

The processor 320 may be embodied by arbitrary hardware, arbitrary software, or a combination thereof and is mainly constituted, for example, by a computer including a CPU, a RAM, a ROM, and an I/O. The processor 320 is a functional unit which is embodied, for example, by causing the CPU to execute one or more programs stored in the ROM and includes a BT communication processing unit 3201.

The BT communication processing unit 3201 controls the BT communication module 310 and performs a connection process to the smart key 200 (the BT communication module 230) which is registered in advance by Bluetooth communication.

Referring to FIG. 1 again, the camera ECU 20 is an electronic control unit that controls the operation of a camera 21 (cameras 21D and 21P which will be described later). The function of the camera ECU 20 may be embodied by arbitrary hardware, arbitrary software, or a combination thereof and the camera ECU 20 is mainly constituted, for example, by a microcomputer including a CPU, a RAM, a ROM, and an I/O. For example, the camera ECU 20 starts the camera 21 by turning on the ignition (IG-ON) of the vehicle 100 and stops the camera when the smart key 200 is not detected by the comparison ECU 10 (the authentication processing unit 103) after the ignition of the vehicle 100 is turned off (IG-OFF). For example, the camera ECU 20 transmits an imaging command to the camera 21 in response to an imaging request received from the user identification ECU 70. The camera ECU 20 is connected to the user identification ECU 70 in a communicable manner via an on-board network such as a CAN and transmits a captured image (a face image) input from the camera 21 to the user identification ECU 70.

The camera 21 captures an image of an area centered on a face of a user inside the vehicle under the control of the camera ECU 20. The camera 21 includes a camera 21D that images a user on a driver seat and a camera 21P that images a user in a passenger seat. For example, the cameras 21D and 21P are attached to header parts on the front-upper sides of the driver seat and the passenger seat inside the vehicle. The camera 21 (the cameras 21D and 21P) is connected to the camera ECU 20, for example, via a one-to-one communication line and transmits the captured images (the face image) to the camera ECU 20.

The camera 21 may include a camera that images an area centered on a face of a user on a seat other than the driver seat and the passenger seat, for example, a back seat of the vehicle 100 in addition to the cameras 21D and 21P that image users on the driver seat and the passenger seat. Accordingly, an image of a face of a user sitting on a seat other than the driver seat and the passenger seat of the vehicle 100 can be captured.

The door courtesy switch 30 is turned ON/OFF depending on opening/closing of each door of the vehicle 100. The door courtesy switch 30 is connected to the user identification ECU 70 in a communicable manner via a one-to-one communication line or an on-board LAN such as a CAN, and transmits a state signal (an open signal or a closed signal) corresponding to an open/closed state of the vehicle 100 to the user identification ECU 70.

The occupant sensor 40 is an existing detection unit that detects a user sitting on a seat of the vehicle 100. The occupant sensor 40 is disposed, for example, in the driver seat and the passenger seat. The occupant sensor 40 is connected to the user identification ECU 70 in a communicable manner via a one-to-one communication line or an on-board network such as a CAN, and transmits a state signal indicating a detection state of an occupant to the user identification ECU 70.

The occupant sensor 40 may be provided in other seats of the vehicle 100 in addition to the driver seat and the passenger seat. Accordingly, it is possible to detect an occupant sitting on a specified seat other than the driver seat and the passenger seat.

The ignition switch (IG switch) 50 turns the ignition of the vehicle 100 on or off in response to an operation of a user. The IG switch 50 is connected to the user identification ECU 70 in a communicable manner via a one-to-one communication line or an on-board network such as a CAN and a state signal (an IG signal) thereof is transmitted to the user identification ECU 70.

Ignition-ON of the vehicle 100 means that the vehicle 100 is started in a runnable state and includes turning on a high-voltage power source of an electric vehicle as well as starting an engine of an engine vehicle.

The wheel speed sensor 60 is an existing detection unit that detects a rotation speed of each wheel of the vehicle 100. The wheel speed sensor 60 is connected to the user identification ECU 70 in a communicable manner, for example, via a one-to-one communication line or an on-board network such as a CAN and transmits a detection signal to the user identification ECU 70.

The user identification ECU 70 is an electronic control unit that performs a control process of identifying a user who is going to board or has boarded the vehicle 100. The function of the user identification ECU 70 may be embodied by arbitrary hardware, arbitrary software, or a combination thereof, and the user identification ECU 70 is mainly constituted, for example, by a microcomputer including a CPU, a RAM, a ROM, and an I/O. The functional configuration of the user identification ECU 70 will be described below with reference to FIG. 3.

Figure 3:
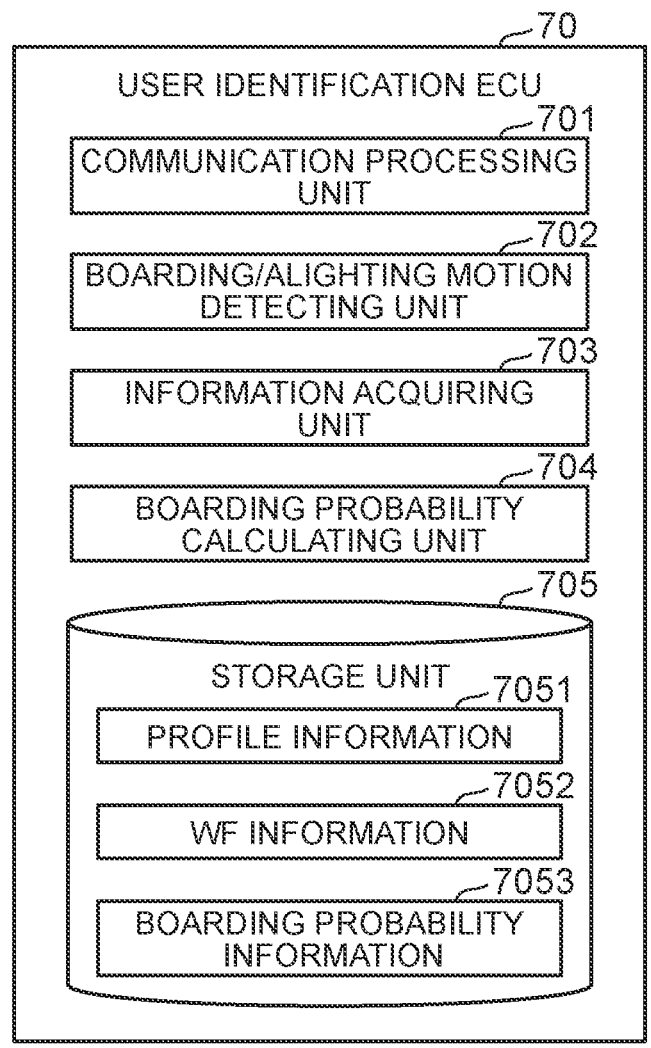
FIG. 3 is a functional block diagram illustrating an example of a configuration of a user identification ECU according to the first embodiment.

FIG. 3 is a functional block diagram illustrating an example of the configuration of the user identification ECU 70.

The user identification ECU 70 is a functional unit that is embodied, for example, by causing the CPU to execute one or more programs stored in the ROM and includes a communication processing unit 701, a boarding/alighting motion detecting unit 702, an information acquiring unit 703, and a boarding probability calculating unit 704. The user identification ECU 70 includes a nonvolatile storage unit 705 as a memory area which is defined in a nonvolatile internal memory such as an electrically erasable programmable read-only memory (EEPROM).

The storage unit 705 may be disposed in an external storage device which is connected to the user identification ECU 70 in a communicable manner.

The communication processing unit 701 performs a process of transmitting and receiving various signals to and from various ECUs (for example, the comparison ECU 10, the camera ECU 20, and the on-board device ECU 80) which are connected thereto via an on-board network such as a CAN. For example, the communication processing unit 701 transmits the above-mentioned transmission command to the comparison ECU 10 in response to a transmission request from the information acquiring unit 703. For example, the communication processing unit 701 receives the attribute information (a key ID) of the detected smart key 200 which is transmitted from the comparison ECU 10. For example, the communication processing unit 701 receives the above-mentioned connection state signal indicating a connection state between the detected smart key 200 and the portable terminal 300 from the comparison ECU 10. For example, the communication processing unit 701 transmits the above-mentioned imaging request to the camera ECU 20 in response to a transmission request from the information acquiring unit 703. For example, the communication processing unit 701 receives a captured image (a face image) of the camera 21 (the cameras 21D and 21P) transmitted from the camera ECU 20 having received the imaging request. For example, the communication processing unit 701 transmits boarding probability information 7053 to various ECUs or the like connected to an on-board network in response to a transmission request from the boarding probability calculating unit 704.

The boarding/alighting motion detecting unit 702 (an example of a detection unit) detects a user's motion accompanied by change of an occupant of the vehicle 100, that is, a user's motion when boarding or alighting from the vehicle 100 is performed. Examples of a user's motion when boarding the vehicle 100 is performed include a predetermined operation after sitting (for example, an identification operation of selecting a driver or the like which will be described later) in addition to a motion of approaching the vehicle 100, a motion of unlocking a door of the vehicle 100, a motion of opening a door of the vehicle 100, a motion of sitting on a seat of the vehicle 100, a motion of closing a door of the vehicle 100, and an IG-ON operation of the vehicle 100. Examples of a user's motion when alighting from the vehicle 100 is performed include a motion of opening a door of the vehicle 100, a seat leaving motion (a motion of standing up from a seat), a motion of closing a door of the vehicle 100, and a motion of leaving the vehicle 100. For example, the boarding/alighting motion detecting unit 702 detects a motion of approaching the vehicle 100 and a motion of leaving the vehicle 100 by a target user carrying the smart key 200 based on the key detection information of the smart key 200 which is received by the communication processing unit 701. For example, the boarding/alighting motion detecting unit 702 detects a motion of approaching the vehicle 100 and a motion of leaving the vehicle 100 by a target user carrying the portable terminal 300 based on the connection state signal of the portable terminal 300 which is received by the communication processing unit 701. For example, the boarding/alighting motion detecting unit 702 detects a user's motion of unlocking a door of the vehicle 100 based on locked/unlocked state information which is received from the body ECU 80-1 by the communication processing unit 701. For example, the boarding/alighting motion detecting unit 702 detects a user's motion of opening a door of the vehicle 100 based on a state signal (an open signal) which is received from the door courtesy switch 30. For example, the boarding/alighting motion detecting unit 702 detects a motion of taking a seat of the vehicle 100 and a motion of leaving a seat by a user based on the state signal which is received from the occupant sensor 40. For example, the boarding/alighting motion detecting unit 702 may detect a motion of taking a seat of the vehicle 100 and a motion of leaving a seat by a user based on a series of state signals (that is, an open signal and a closed signal which are continuously received in a predetermined time) which are received from the door courtesy switch 30. For example, the boarding/alighting motion detecting unit 702 detects an IG-ON operation of the vehicle 100 based on an IG signal which is received from the IG switch 50.

When one of a plurality of prescribed motions of a user (hereinafter referred to as a "target motion") when boarding and alighting from the vehicle 100 is performed is detected by the boarding/alighting motion detecting unit 702, the information acquiring unit 703 (an example of an acquisition unit) acquires at least K types (M≥K≥2) of boarding display information among M types (M≥2) of information (boarding display information) indicating that one of a plurality of users (hereinafter referred to as "target users") who are registered in advance in the vehicle 100 (the user identification ECU 70) is going to board or has boarded the vehicle 100. That is, the information acquiring unit 703 acquires a plurality of types (at least K types) of boarding display information in a plurality of scenes (each of which is one segmentation of each target motion) in which a plurality of target motions of a user when at least one of boarding and alighting from the vehicle 100 is performed is performed. The types of the boarding display information include attribute information of the smart key 200, attribute information of the portable terminal 300, information of captured images (face images) of the cameras 21D and 21P, and information on details of an operation of causing a user to identify an occupant (for example, an operation of selecting a driver among a plurality of users who are displayed on a display screen inside the vehicle, which is hereinafter referred to as an identification operation). A target motion includes a part or a whole of a motion which is to be detected by the boarding/alighting motion detecting unit 702. For example, when a target motion is detected by the boarding/alighting motion detecting unit 702, the information acquiring unit 703 sends a transmission request to the communication processing unit 701 and the communication processing unit 701 transmits a transmission command to the comparison ECU 10 in response to the transmission request as described above. Accordingly, the comparison ECU 10 having received the transmission command performs the above-mentioned various processes, and the information acquiring unit 703 can acquire the key detection information (the detection state of the smart key 200 and the attributed information of the detected smart key 200) and the connection state signal (the attribute information of the portable terminal 300 connected to the smart key 200) via the communication processing unit 701. For example, when a target motion is detected by the boarding/alighting motion detecting unit 702, the information acquiring unit 703 sends a transmission request to the communication processing unit 701 and the communication processing unit 701 transmits an imaging command to the camera ECU 20 in response to the transmission request as described above. Accordingly, the camera ECU 20 having received the imaging command performs the above-mentioned various processes, and the information acquiring unit 703 can acquire the captured images (face images) of the cameras 21D and 21P via the communication processing unit 701. As described above, when the cameras 21D and 21P or the camera ECU 20 is stopped (that is, when the vehicle 100 is in the IG-OFF state), the information acquiring unit 703 cannot acquire the captured images (face images) of the cameras 21D and 21P. Accordingly, the information acquiring unit 703 may not transmit a transmission request for an imaging command to the communication processing unit 701 in a state in which it is known in advance that the captured images (face images) of the cameras 21D and 21P may not be acquired. The information acquiring unit 703 acquires information on details of the specific operation of a user (for example, information on a user who is selected as a driver among the plurality of users registered in advance) based on information which the communication processing unit 701 receives from a human-machine interface (HMI)-ECU 80-N that controls an operation unit on which the user performs an operation (an identification operation) of identifying an occupant.

The plurality of prescribed target motions when at least one of boarding and alighting from the vehicle 100 is performed refer to a plurality of target motions of a target user which are performed in a state in which a target user who is going to board or has boarded the vehicle 100 needs to be identified, that is, a state in which an occupant of the vehicle 100 changes. Basically, only boarding is performed, for example, when a user boards the vehicle 100 in a parked state, and only alighting is performed, for example, when alighting from the vehicle 100 en route. However, when boarding and alighting from the vehicle 100 en route are simultaneously performed, both of the boarding and the alighting are performed. In this embodiment, it is assumed that M=4 and K=2 are set (in which at least two types of boarding display information among four types of boarding display information can be acquired) as will be described later, but for example, the captured images of the cameras 21D and 21P or the information on the identification operation may be omitted and M=2 and K=2 may be set. That is, a boarding probability to be described later has only to be calculated from at least a plurality of types (two or more types) of information.

The boarding probability calculating unit 704 (an example of a probability calculating unit) calculates a probability (a boarding probability) that each target user is going to board or has boarded the vehicle 100 based on a plurality of types (at least K types) of boarding display information (such as the attribute information of the smart key 200, the attribute information of the portable terminal 300, and the captured images of the cameras 21D and 21P) acquired by the information acquiring unit 703 and profile information 7051 which is stored in the storage unit 705. The profile information 7051 (an example of the association information) is association information in which identification information (for example, a user ID) of each target user is associated with M types of boarding display information corresponding to the user, and is registered in the storage unit 705 in advance. Hereinafter, the profile information 7051 will be described with reference to FIG. 4.

FIG. 4 is a diagram illustrating an example of the profile information 7051. In this embodiment including this example, it is assumed that three users A to C are registered as the target users in advance in the vehicle 100 (the user identification ECU 70).

In the drawing, details of parts (fields) of "user A," "user B," and "user C" specifically denote identification information such as user IDs. Information indicating details of face images ("α," "β," and "γ") in the drawing denotes an identifier (for example, an ID or an address of a memory area) for identifying face images stored in the storage unit 705. "Selection A," "selection B," and "selection C" of the identification operation in this example denote operations of selecting user A, user B, and user C as a driver.

As illustrated in FIG. 4, attribute information (key IDs) of smart keys 200, attribute information (BT addresses) of portable terminals 300, identifiers of face images, and details of identification operations, which correspond to users A to C, are shown in the form of a table.

Specifically, the key ID, the BT address, the identifier of the face image, and the identification operation which correspond to user A are "XXXXXX," "AAAAAA," "α," and "selection A." The key ID, the BT address, the identifier of the face image, and the identification operation which correspond to user B are "XXXXXX," "BBBBBB," "β" and "selection B." The key ID, the BT address, the identifier of the face image, and the identification operation which correspond to user C are "YYYYYY," "CCCCCC," "γ" and "selection C."

The key IDs corresponding to users A and B are "XXXXXX," which represents that the same smart key 200 (a smart key 200X which will be described later) is shared by two users A and B.

The boarding probability calculating unit 704 can predict a target user who is going to board or has boarded the vehicle 100 with the smart key 200 carried or with the smart key 200 and the portable terminal 300 carried by comparing the attribute information of the smart key 200 which is acquired by the information acquiring unit 703, the attribute information of the portable terminal 300, and the profile information 7051.

The boarding probability calculating unit 704 performs an existing face recognition process based on the captured images of the cameras 21D and 21P acquired by the information acquiring unit 703 and all the face images stored in the storage unit 705, and determines a face image corresponding to the captured image. The boarding probability calculating unit 704 can predict a target user who takes (sits on) a driver seat or a passenger seat of the vehicle 100 by comparing the identifier of the face image determined to correspond to the captured image with the profile information 7051. That is, since the captured images of the cameras 21D and 21P are acquired to correspond to a plurality of seat classifications (a driver seat and a passenger seat) of the vehicle 100, the boarding probability calculating unit 704 can predict the seat classification on which the target user sits.

Instead of or in addition to the cameras 21D and 21P, a biometric authentication sensor may be provided in each door of the vehicle 100. Accordingly, the boarding probability calculating unit 704 can identify a target user who opens each door based on the detection result of the biometric authentication sensor (for example, a fingerprint authentication sensor) which is acquired by the information acquiring unit 703, and thus predict the seat classification on which the target user sits. The face recognition process may be performed by the camera ECU 20. In this case, the boarding probability calculating unit 704 can predict the target user who sits on the driver seat or the passenger seat of the vehicle 100 by comparing the result of the face recognition process (the identifier of the face image) received from the camera ECU 20 by the communication processing unit 701 with the profile information 7051.

The boarding probability calculating unit 704 can predict the target user who sits on the driver seat of the vehicle 100 by comparing details of the identification operation acquired by the information acquiring unit 703 with the profile information 7051.

As illustrated in FIG. 4, a target user may be added to the profile information 7051 in the form of a table and a location (a part of N/R corresponding to the user in the drawing) in which a key ID, a BT address, an identifier of a face image, and details of an identification operation corresponding to the added user are registered is prepared in advance. Accordingly, a target user can be added later.

As illustrated in FIG. 4, a type of boarding display information which can be acquired by the information acquiring unit 703 can be added to the profile information 7051 in the form of a table, and a location (a part of N/R corresponding to the boarding display information in the drawing) in which the added type of boarding display information corresponding to each of the users is registered is prepared in advance. Accordingly, it is possible to appropriately cope with a case in which a type of boarding display information which can be acquired by the information acquiring unit 703 is added later (for example, a case in which a biometric authentication sensor is added later).

In this way, the boarding probability calculating unit 704 can predict a user who is going to board or has boarded the vehicle 100 based on the K types of boarding display information acquired by the information acquiring unit 703 and the profile information 7051. For example, the boarding probability calculating unit 704 applies weight factor (WF) information 7052 stored in the storage unit 705 to the prediction result (the prediction result of a target user who is going to board or has boarded the vehicle 100 based on the types of boarding display information) based on the profile information 7051, and calculates the boarding probabilities. Hereinafter, a method of calculating a boarding probability will be described with reference to FIG. 5.

FIG. 5 is a diagram illustrating an example of the WF information 7052. Specifically, weight factors (WF) for the prediction results based on the types of boarding display information are described as percentages.

As illustrated in FIG. 5, weight factors (WF) for determination elements (the prediction results based on the boarding information and a boarding history) for calculating the boarding probability are described in the form of a table.

Specifically, when it is predicted that a target user is going to board or has boarded the vehicle 100 based on the attribute information (the key ID) of the smart key 200, 20% is added to the boarding probability of the target user.

When it is predicted that a target user is going to board or has boarded the vehicle 100 based on the attribute information (the BT address) of the portable terminal 300, 30% which is greater than the weight factor corresponding to the attribute information of the smart key 200 is added to the boarding probability of the target user. This is because the smart key 200 may be shared by a plurality of target users as described above, but the portable terminal 300 is rarely shared by a plurality of target users.

When it is predicted that a target user is going to board or has boarded the vehicle 100 based on the face image, 35% which is greater than the weight factor corresponding to the attribute information of the smart key 200 or the portable terminal 300 is added to the boarding probability of the target user. This is because the face authentication based on a face image employs a captured image of a target user and is considered to have higher reliability than that of the indirect prediction result based on the portable terminal 300 or the smart key 200.

When it is predicted that a target user is going to board or has boarded the vehicle 100 based on the identification operation, 35% which is equal to the weight factor corresponding to the face image is added to the boarding probability of the target user. This is because the identification operation is based on a target user's own operation and thus is considered to have higher reliability similarly to the face authentication.

In this example, the total sum of all the weight factors is greater than 100%, but since it is a premise that only any one of the prediction result based on the face image and the prediction result based on the identification operation is acquired, the total boarding probability does not exceed 100%. Specifically, a screen display corresponding to the identification operation is performed before the vehicle 100 is subjected to IG-ON and the face image can be acquired after the vehicle 100 is subjected to IG-ON as described above.

In this embodiment, the boarding history is considered in addition to the prediction results based on the types of boarding display information. Specifically, when a boarding frequency is determined to be relatively high based on the boarding history (for example, when a ratio of the boarding frequency to the total number of trips is equal to or greater than a predetermined threshold value), a weight factor (10%) based on the boarding history is added to the boarding probability of the target user. The boarding frequency is set, for example, using one trip from IG-ON of the vehicle 100 to IG-OFF as one time and can be updated such that the boarding frequency for a target user of which the boarding probability calculated by the boarding probability calculating unit 704 is equal to or greater than a predetermined threshold value is increased by 1 immediately before the vehicle 100 starts running (which includes both start of running immediately after IG-ON and start of running after boarding/alighting of the target user is performed en route).

Similarly to the example illustrated in FIG. 4, a location (a part of N/R corresponding to the boarding display information in the drawing) to which a type of boarding display information which can be acquired by the information acquiring unit 703 is added in advance in the WF information 7052 in the form of a table. Accordingly, it is possible to appropriately cope with a case in which a type of boarding display information which can be acquired by the information acquiring unit 703 is added later (for example, a case in which a biometric authentication sensor is added later).

The boarding probability calculating unit 704 sets a flag (a vehicle-inside flag F) indicating whether the calculated boarding probability is a probability that the user is going to board the vehicle 100 or a probability that the user has boarded the vehicle 100. For example, the boarding probability calculating unit 704 can determine whether a target user corresponding to the detected smart key 200 and the portable terminal 300 connected to the smart key 200 are present outside the vehicle or inside the vehicle based on a detection history of the boarding/alighting motion detecting unit 702. That is, before a door is opened, the target user corresponding to the detected smart key 200 and the portable terminal 300 connected to the smart key 200 are present outside the vehicle and thus the boarding probability indicates the probability that the user is going to board the vehicle 100. After a door is opened or after a seat taking motion is performed, the target user is present inside the vehicle as long as a seat leaving motion is not performed, and thus the boarding probability indicates the probability that the user has boarded the vehicle 100. For example, according to the prediction result based on the face images by the boarding probability calculating unit 704, the boarding probability uniquely represents a probability that a user has boarded the vehicle 100. This is because the captured images (face images) of the cameras 21D and 21P cannot be acquired when the target user is not present inside the vehicle. The boarding probability calculating unit 704 sets the vehicle-inside flag F to 0 when the boarding probability indicates the probability that the user is going to board the vehicle 100, and sets the vehicle-inside flag F to 1 when the boarding probability indicates the probability that the user has boarded the vehicle 100.

When the boarding probability is 0%, the vehicle-inside flag F may not be set to any value or may be set to "0" as in the case in which the target user is outside the vehicle. This is because when the boarding probability is 0%, the value of the vehicle-inside flag F has no meaning.

The boarding probability calculating unit 704 generates boarding probability information 7053 including the calculated boarding probability of each target user, the predicted seat classification (predicted seat classification), and the vehicle-inside flag F, stores (updates) the generated boarding probability information 7053 in the storage unit 705, and sends a transmission request to the communication processing unit 701. Accordingly, the communication processing unit 701 transmits the boarding probability information 7053 to various ECUs connected to the on-board network as described above. Hereinafter, details of the boarding probability information 7053 will be described with reference to FIG. 6.

Figures 6, 7:
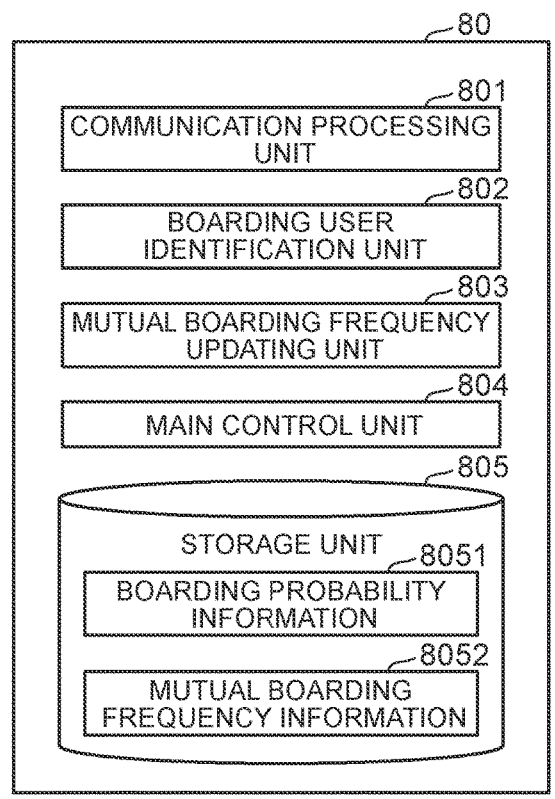
FIG. 6 is a diagram illustrating an example of WF information.
FIG. 7 is a functional block diagram illustrating an example of a configuration of an on-board device ECU according to the first embodiment.

FIG. 6 is a diagram illustrating an example of the boarding probability information 7053.

As illustrated in FIG. 6, the seat classifications, the vehicle-inside flags F, and the boarding probabilities corresponding to users A to C are described in the form of a table.

In this example, as for user A, the seat classification is "driver seat (D seat)," the vehicle-inside flag is "1," and the boarding probability is "50%." As for user B, the seat classification is "passenger seat (P seat)," the vehicle-inside flag is "1," and the boarding probability is "50%." As for user C, the seat classification is non-determined, the vehicle-inside flag is "0," and the boarding probability is "30%."

Similarly to the example illustrated in FIG. 4, a location (a part of N/R corresponding to the user in the drawing) in which a target user is added is prepared in advance in the boarding probability information 7053 in the form of a table. Accordingly, a target user can be added later.

Referring to FIG. 1 again, the on-board device ECU 80 is an electronic control unit that controls various on-board devices which are to be controlled. The function of the on-board device ECU 80 may be embodied by arbitrary hardware, arbitrary software, or a combination thereof and the on-board device ECU 80 is mainly constituted, for example, by a microcomputer including a CPU, a RAM, a ROM, and an I/O. In this embodiment, the on-board device ECU 80 receives the boarding probability information 7053 transmitted from the user identification ECU 70 and controls the on-board devices based on the received boarding probability information (boarding probability information 8051 which will be described later). The on-board device ECU 80 is connected to various ECUs (for example, the comparison ECU 10, the camera ECU 20, and the user identification ECU 70) in a communicable manner via the on-board network such as a CAN. The on-board device ECU 80 includes a plurality of on-board device ECUs 80-1 to 80-N (N≥3).

In this example, N≥3 is set, but N=1 or N=2 may be set.

The body ECU 80-1 is an electronic control unit that controls, for example, locking-unlocking devices (not illustrated) of doors of the vehicle 100, seat position adjusting devices (not illustrated) of a driver seat and a passenger seat of the vehicle 100, a steering position adjusting device (not illustrated), and a door mirror adjusting device (not illustrated). In this embodiment, the body ECU 80-1 controls the locking-unlocking devices, the seat position adjusting devices, and the steering position adjusting device based on the boarding probability information 8051. The body ECU 80-1 transmits information on the state with regard to locking-unlocking of the doors (information on whether the doors are locked) of the vehicle 100 by the locking-unlocking device to various ECUs via the on-board network.

The air-conditioning ECU 80-2 is an electronic control unit that controls an air-conditioning device (not illustrated) of the vehicle 100, and controls the air-conditioning device based on the boarding probability information 8051 in this embodiment.

The HMI-ECU 80-N is an electronic control unit that performs a control process related to an HMI function with a user of the vehicle 100. For example, the HMI-ECU 80-N controls an information display device that displays a variety of information on a display device inside the vehicle in addition to a navigation device and an audio device of the vehicle 100. In this embodiment, the HMI-ECU 80-N controls the navigation device, the audio device, the information display device, and the like based on the boarding probability information 8051.

The functional configuration of the on-board device ECU 80 will be described below with reference to FIG. 7.

FIG. 7 is a functional block diagram illustrating an example of the configuration of the on-board device ECU 80.

The on-board device ECU 80 is a functional unit which is embodied, for example, by causing the CPU to execute one or more programs stored in the ROM, and includes a communication processing unit 801, a boarding user identification unit 802, a mutual boarding frequency updating unit 803, and a main control unit 804. The on-board device ECU 80 includes, for example, a storage unit 805 as a memory area which is defined in a nonvolatile internal memory such as an EEPROM.

The communication processing unit 801 performs processes associated with transmission and reception of various signals with various ECUs which are connected thereto via the on-board network such as a CAN. For example, the communication processing unit 801 receives the boarding probability information 7053 transmitted from the user identification ECU 70 and stores the received boarding probability information 7053 in the storage unit 805 (the boarding probability information 8051). As described above, since the boarding probability information 7053 is generated and is transmitted to the on-board device ECU 80 whenever the boarding/alighting motion detecting unit 702 detects a target motion, the communication processing unit 801 updates the boarding probability information 8051 in the storage unit 805 whenever the boarding probability information 7053 is received.

The boarding user identification unit 802 (an example of an identification unit) identifies a user who is going to board or has boarded the vehicle 100 based on the boarding probability information 8051. For example, the boarding user identification unit 802 may identify a target user of which the boarding probability in the boarding probability information 8051 is equal to or greater than a predetermined threshold value as the user who is going to board or has boarded the vehicle 100. The threshold value may be set to be variable depending on a time at which the target user is identified, for example, when the target user is present outside the vehicle and when the target user is present inside the vehicle. The number of types of the boarding display information (the attribute information of the smart key 200 and the attribute information of the portable terminal 300) which can be acquired for a target user outside the vehicle is often less than the number of types of the boarding display information (the attribute information of the smart key 200, the attribute information of the portable terminal 300, the information on the identification operation, and the information of the face images of the cameras 21D and 21P) which can be acquired for a target user inside the vehicle. Accordingly, for example, by setting the threshold value when the target user is present outside the vehicle to be less than the threshold value when the target user is present inside the vehicle, it is possible to appropriately identify a target user outside the vehicle for which the number of types of boarding display information which can be acquired is fewer as a user who is going to board the vehicle 100. The boarding user identification unit 802 identifies the seat classification of the user who is going to board or has boarded the vehicle based on the boarding display information (the captured images of the cameras 21D and 21P) which is acquired to correspond to one of a plurality of seat classifications (a driver seat and a passenger seat) of the vehicle 100. Specifically, the boarding user identification unit 802 identifies the seat classification of the user who is going to board or has boarded the vehicle from the seat classifications of the target users predicted based on the captured images of the cameras 21D and 21P by the boarding probability calculating unit 704 (the predicted seat classifications of the target users in the boarding probability information 8051). Since the on-board device ECUs 80-1 to 80-N can arbitrarily identify a target user, a target user is identified under relatively loose conditions for an on-board device permitting a state in which an identification accuracy of a target user is relatively low, and a target user is identified under relatively strict conditions for an on-board device requiring a state in which an identification accuracy of a target user is relatively high. In this way, a degree of freedom in identifying a target user can be provided.

Instead of the on-board device ECUs 80-1 to 80-N, the user identification ECU 70 may identify a user who is going to board or has boarded the vehicle 100 and transmit the identification result to the on-board device ECUs 80-1 to 80-N.

The mutual boarding frequency updating unit 803 (an example of a mutual boarding frequency counting unit) counts a mutual boarding frequency of target users based on the identification result from the boarding user identification unit 802 and performs a process of updating mutual boarding frequency information 8052 including the mutual boarding frequencies of the target users. By defining one trip from IG-ON of the vehicle 100 to IG-OFF as one time, the mutual boarding frequency updating unit 803 counts the mutual boarding frequency and updates the mutual boarding frequency information 8052 such that the mutual boarding frequency of two or more target users is increased by 1 when the two or more target users are identified to board the vehicle immediately before the vehicle 100 starts running (at least one of start of running immediately after IG-ON and start of running after boarding and alighting of a target user is performed en route).

The main control unit 804 (an example of a control unit) performs a process of controlling the on-board devices (such as the locking-unlocking device, the seat position adjusting device, the steering position adjusting device, the door mirror adjusting device, the air-conditioning device, the navigation device, the audio device, and the information display device) which are to be controlled. For example, the main control unit 804 controls the on-board devices depending on a control condition (a control mode) which is set in advance to correspond to the target user who is identified as the user who is going to board or has boarded the vehicle 100 by the boarding user identification unit 802. Specifically, the main control unit 804 of the body ECU 80-1 may control the locking-unlocking device based on an unlocking mode (for example, an unlocking mode in which only a door on which an unlocking operation is performed is unlocked or an unlocking mode in which all doors are unlocked) which is prescribed to correspond to a target user who is going to board the vehicle 100. The main control unit 804 of the body ECU 80-1 may control the locking-unlocking device based on a locking mode (for example, a locking mode in which all doors are locked after the doors are closed or a locking mode in which the doors are not locked after the doors are closed) which is preset to correspond to a target user who has sat on the driver seat of the vehicle 100. The main control unit 804 of the body ECU 80-1 may control the seat position adjusting device based on seat position information which is preset to correspond to target users who have sit on the driver seat and the passenger seat of the vehicle 100. The main control unit 804 of the body ECU 80-1 may control the steering position adjusting device based on steering position information which is preset to correspond to a target user who has sat on the driver seat of the vehicle 100. The body ECU 80-1 may control the door mirror adjusting device based on door mirror angle information which is preset to correspond to a target user who has sat on the driver seat of the vehicle 100. The main control unit 804 of the air-conditioning ECU 80-2 may control the air-conditioning device based on an air-conditioning mode which is preset to correspond to a target user who has been identified to board the vehicle. The main control unit 804 of the air-conditioning ECU 80-2 may independently control the air-conditioning mode of the driver seat and the air-conditioning mode of the passenger seat based on the air-conditioning mode which is preset to correspond to target users who have been identified to sit on the driver seat and the passenger seat. The main control unit 804 of the HMI-ECU 80-N may control the navigation device based on a display mode (for example, a scale of a map screen or a display mode on which of the north direction and the running direction of the vehicle 100 should be used as a reference) which is preset to correspond to a target user who has been identified to board the vehicle. The main control unit 804 of the HMI-ECU 80-N may control the audio device based on a type of a sound source which is preset to correspond to a target user who has boarded the vehicle. The main control unit 804 of the HMI-ECU 80-N may control the information display device such that a welcome message which is preset to correspond to a target user who has sat on the driver seat of the vehicle 100 is displayed on a display screen inside the vehicle. Accordingly, since various on-board devices can be controlled depending on a taste, a body type, or the like of a user who is going to board or has boarded the vehicle 100, it is possible to improve convenience for a user.

A boarding probability calculating process which is performed by the user identification ECU 70 to correspond to a state in which a target user boards the vehicle 100 in a parked state (in an IG-OFF state) will be described below with reference to FIG. 8.

Figure 8:
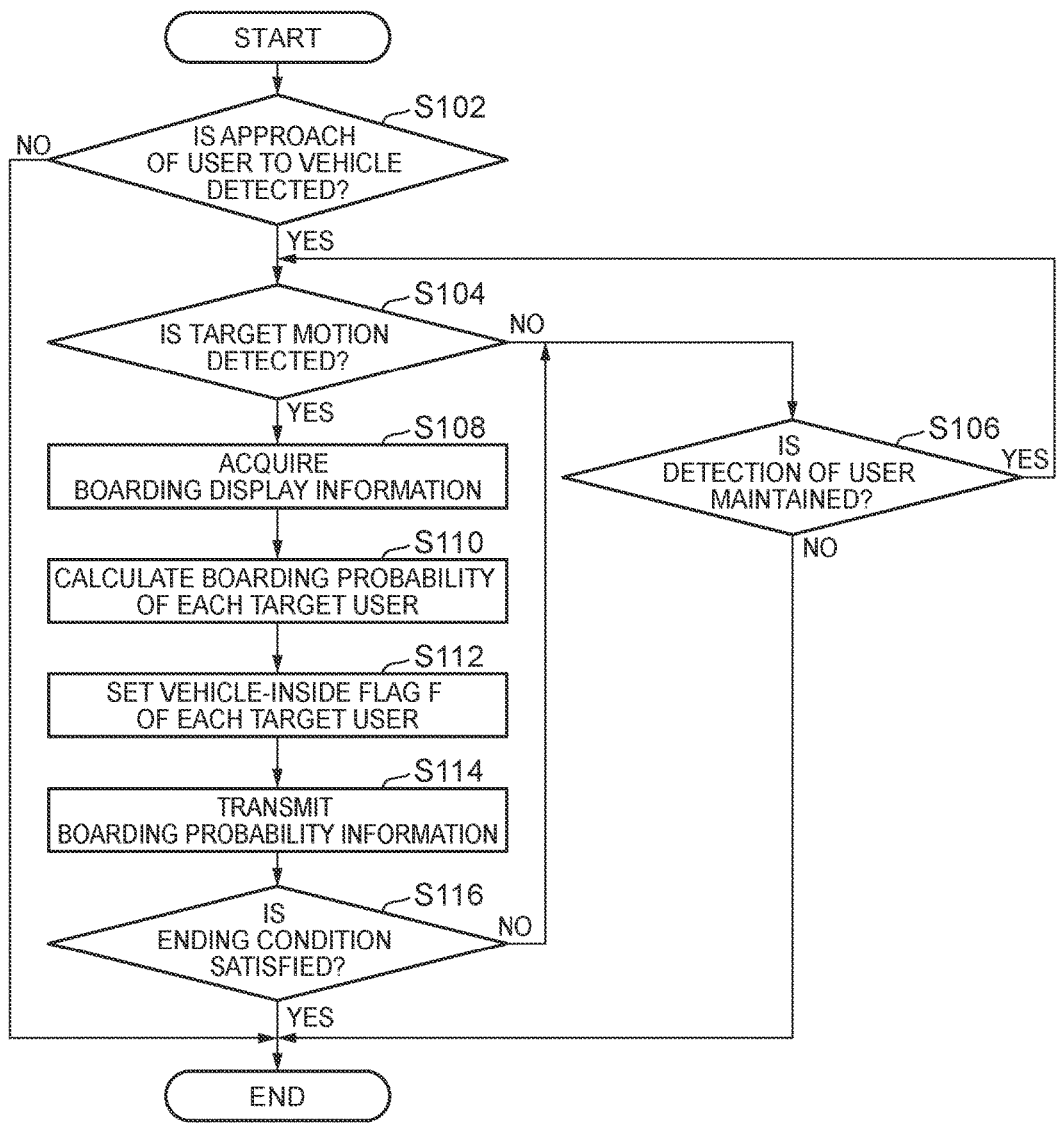
FIG. 8 is a flowchart schematically illustrating an example of a boarding probability calculating process which is performed by the user identification ECU.

FIG. 8 is a flowchart schematically illustrating an example of the boarding probability calculating process which is performed by the user identification ECU 70. The process flow of the flowchart is repeatedly performed at predetermined time intervals, for example, when the vehicle 100 is subjected to IG-OFF and the comparison ECU 10 (the authentication processing unit 103) does not detect the smart key 200.

In Step S102, the boarding/alighting motion detecting unit 702 determines whether a target user's motion of approaching the vehicle 100 has been detected. The process flow transitions to S104 when the boarding/alighting motion detecting unit 702 detects the target user's motion of approaching the vehicle 100, and the process flow is ended when the approaching motion is not detected.

In Step S104, the boarding/alighting motion detecting unit 702 determines whether a target motion has been detected. The process flow transitions to Step S106 when the boarding/alighting motion detecting unit 702 does not detect a target motion, and the process flow transitions to Step S108 when a target motion is detected.

In Step S106, the boarding/alighting motion detecting unit 702 determines whether a state in which a target user is detected is maintained, that is, whether a state in which the smart key 200 is detected by the comparison ECU 10 (the authentication processing unit 103) is maintained.

In Step S108, the information acquiring unit 703 performs a process of acquiring boarding display information as described above.

In Step S110, the boarding probability calculating unit 704 calculates boarding probabilities of target users based on a plurality of types of boarding display information acquired by the information acquiring unit 703, the profile information 7051, and the WF information 7052 as described above.

In Step S112, the boarding probability calculating unit 704 sets a vehicle-inside flag F corresponding to each target user as described above.

In Step S114, the communication processing unit 701 transmits the boarding probability information 7053 generated (updated) by the boarding probability calculating unit 704 to various ECUs (the on-board device ECU 80) connected thereto via the on-board network as described above.

In Step S116, the boarding/alighting motion detecting unit 702 determines whether an ending condition of the process flow is satisfied. The ending condition is, for example, a condition in which it can be determined that there have been no further changes to the target users having boarded the vehicle 100. For example, the ending condition may be a condition in which running is started after the vehicle 100 is subjected to IG-ON. In this case, the boarding/alighting motion detecting unit 702 may determine whether the vehicle 100 starts running based on a detection signal received from the wheel speed sensor 60. The process flow returns to Step S106 when the boarding/alighting motion detecting unit 702 determines that the ending condition is not satisfied, and the process flow is ended when the ending condition is satisfied.

A process which is performed by the body ECU 80-1 will be described below as an example of a specific process which is performed by the on-board device ECU 80 based on the boarding probability information 8051 with reference to FIG. 9.

Figure 9:
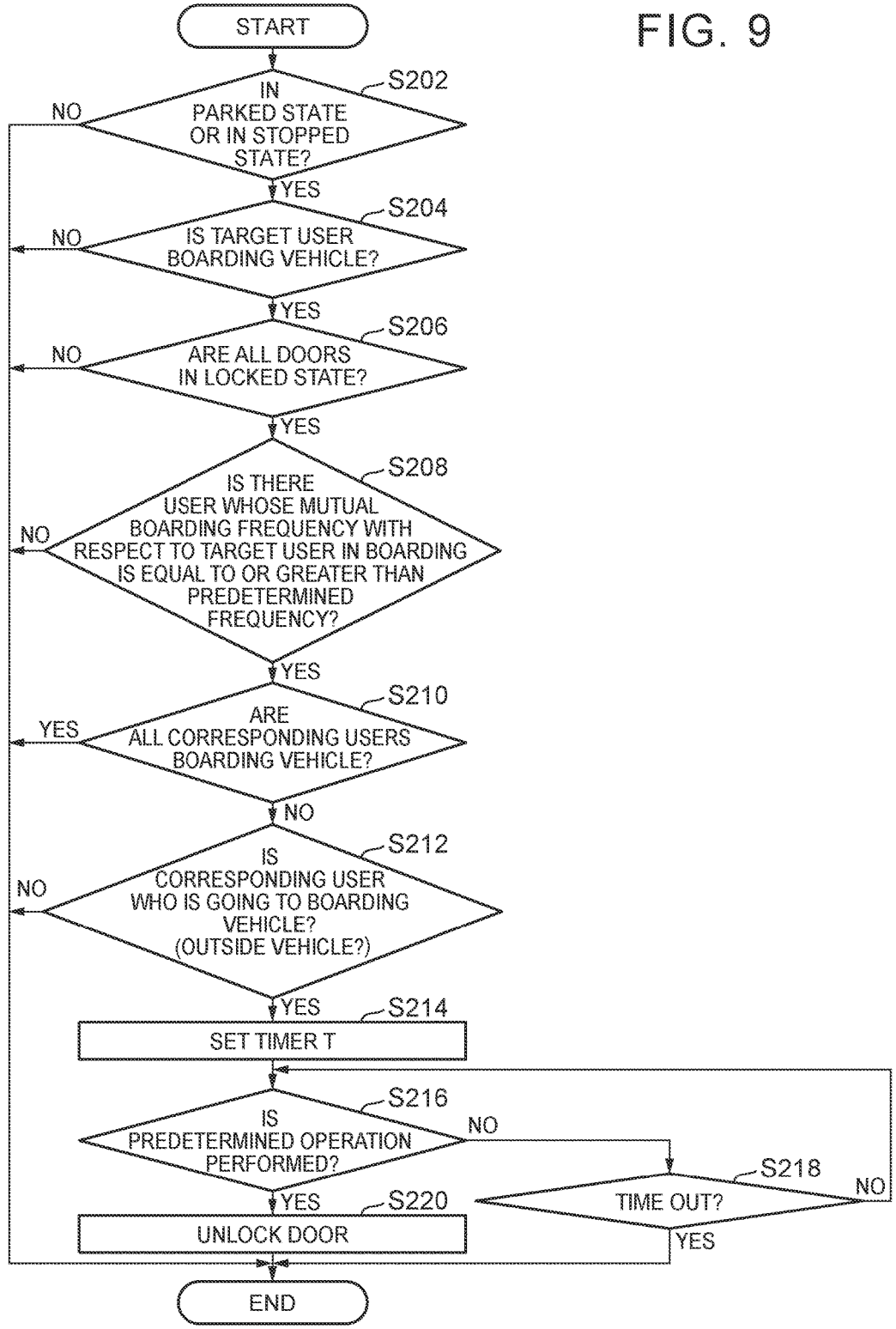
FIG. 9 is a flowchart schematically illustrating an example of an unlocking process which is performed by the on-board device ECU (body ECU)

FIG. 9 is a flowchart schematically illustrating an example of an unlocking process which is performed by the on-board device ECU 80 (the body ECU 80-1). The process flow is repeatedly performed, for example, at predetermined time intervals.

The boarding user identification unit 802, the main control unit 804, and the like in description of the flowchart are functional units of the body ECU 80-1. Similarly, the boarding probability information 8051, the mutual boarding frequency information 8052, and the like in description of the flowchart are information which is stored in the storage unit 805 of the body ECU 80-1.

In Step S202, the main control unit 804 (an example of a locking-unlocking unit) determines whether the vehicle 100 is in a parked state (an IG-OFF state) or in a stopped state (IG-ON). The process flow transitions to Step S204 when the main control unit 804 determines that the vehicle 100 is in a parked state or in a stopped state, and the process flow is ended otherwise.

The body ECU 80-1 may be connected to the IG switch 50 and the wheel speed sensor 60 in a communicable manner via a one-to-one communication line or an on-board network such as a CAN, and the main control unit 804 may perform the determination of this step based on the state signal from the IG switch 50 and the detection signal from the wheel speed sensor 60.

In Step S204, the boarding user identification unit 802 identifies a target user who is going to board or has boarded the vehicle 100 based on the boarding probability information 8051 and determines whether there is a target user who has boarded the vehicle 100. The process flow transitions to Step S204 when the boarding user identification unit 802 determines that there is a target user who has boarded the vehicle 100, and the process flow is ended otherwise.

In Step S206, the main control unit 804 determines whether all doors of the vehicle 100 are locked. The process flow transitions to Step S208 when the main control unit 804 determines that all doors of the vehicle 100 are locked, and the process flow is ended otherwise.

In Step S208, the main control unit 804 determines whether there is a target user of which the mutual boarding frequency with respect to a target user who has boarded the vehicle 100 is equal to or greater than a predetermined frequency based on the mutual boarding frequency information 8052. The process flow transitions to Step S210 when the main control unit 804 determines that there is a target user (hereinafter referred to as a corresponding user) of which the mutual boarding frequency is equal to or greater than the predetermined frequency, and the process flow is ended when there is no target user of which the mutual boarding frequency is equal to or greater than the predetermined frequency.

The predetermined frequency is preset as a threshold value with which the mutual boarding frequency with respect to the target user having boarded the vehicle can be determined to be high.

In Step S210, the boarding user identification unit 802 determines whether all the corresponding users have boarded the vehicle 100. The process flow transitions to Step S212 when the boarding user identification unit 802 determines that at least a part of the corresponding users have not boarded the vehicle 100, and the process flow is ended when all the corresponding users have boarded the vehicle 100.

In Step S212, the boarding user identification unit 802 identifies a target user who is going to board or has boarded the vehicle 100 based on the boarding probability information 8051 and determines whether the corresponding user is identified as the target user who is going to board the vehicle 100. The process flow transitions to Step S214 when the boarding user identification unit 802 identifies the corresponding user as the target user who is going to board the vehicle 100 (that is, the target user outside the vehicle 100), and the process flow is ended otherwise.

In Step S214, the main control unit 804 sets a timer T.

The timer T is set, for example, to a time required until the corresponding user who is going to board the vehicle 100, that is, the corresponding user outside the vehicle 100, reaches a door of the vehicle 100 and performs a predetermined operation with an intention to unlock or open the door of the vehicle 100. For example, the timer T is set to a time which is obtained by adding a margin to a maximum time until the corresponding user will reach the vehicle 100 from a position away by a maximum communication range of the smart key 200 and the portable terminal 300 inside the vehicle 100.

In Step S216, the main control unit 804 determines whether a predetermined operation on the vehicle 100 from outside of the vehicle, for example, an operation of grasping a door handle to unlock or opening a door or an operation of pushing a trigger switch of a door handle, has been performed. The process flow transitions to Step S218 when the main control unit 804 determines that the predetermined operation has not been performed, and the process flow transitions to Step S220 when the predetermined operation has been performed.

The predetermined operation on the vehicle 100 may not be a direct operation on the vehicle 100, and may be an indirect operation such as an operation which is performed by the portable terminal 300 to transmit a signal for requesting unlocking to the vehicle 100 via the smart key 200. In this case, when the operation is performed by the portable terminal 300, the BT communication processing unit 3201 of the portable terminal 300 controls the BT communication module 310 such that a corresponding signal is transmitted to the smart key 200 (the BT communication module 230) by Bluetooth communication. Then, the RF transmission processing unit 2402 of the smart key 200 having received the signal controls the RF transmitter 200 such that the signal is transmitted as RF radio waves to the vehicle 100. Accordingly, the vehicle 100 (the comparison ECU 10) receives the signal and can unlock the door of the vehicle 100.

In Step S218, the main control unit 804 determines whether the timer T has timed out. The process flow returns to Step S216 and the process of Step S216 is repeatedly performed until the timer T times out when the main control unit 804 determines that the timer T has not timed out, and the process flow is ended when the timer T has timed out.

In this example, the timer T is set in Step S214 and it is determined whether the timer has timed out in Step S218, but Step S214 may be skipped and it may be determined in Step S218 whether the corresponding user is present in the vicinity of the vehicle 100 (whether the corresponding user is present within a predetermined distance from the vehicle 100). For example, when the corresponding user carries the portable terminal 300, the main control unit 804 can determine whether the corresponding user is present in the vicinity of the vehicle 100 based on the connection state between the smart key 200 of the target user inside the vehicle and the portable terminal 300 of the corresponding user.

On the other hand, in Step S220, the main control unit 804 unlocks the doors of the vehicle 100. At this time, the main control unit 804 may unlock only the door which the corresponding user intends to open (for example, the door on which a predetermined operation is performed). Accordingly, the corresponding user having a high mutual boarding frequency with respect to the target user who has boarded the vehicle 100 such as a family member or a friend can unlock the doors of the vehicle 100 regardless of whether the smart key 200 is carried. For example, when the target user who has boarded the vehicle 100 locks all the doors and waits for a family member or a friend inside the vehicle, the doors are automatically unlocked with an approach of the corresponding user and it is thus possible to achieve coexistence of security and convenience.

An example of the operations of the user identification system 1 corresponding to FIGS. 8 and 9 will be described below with reference to FIG. 10.

Figure 10:
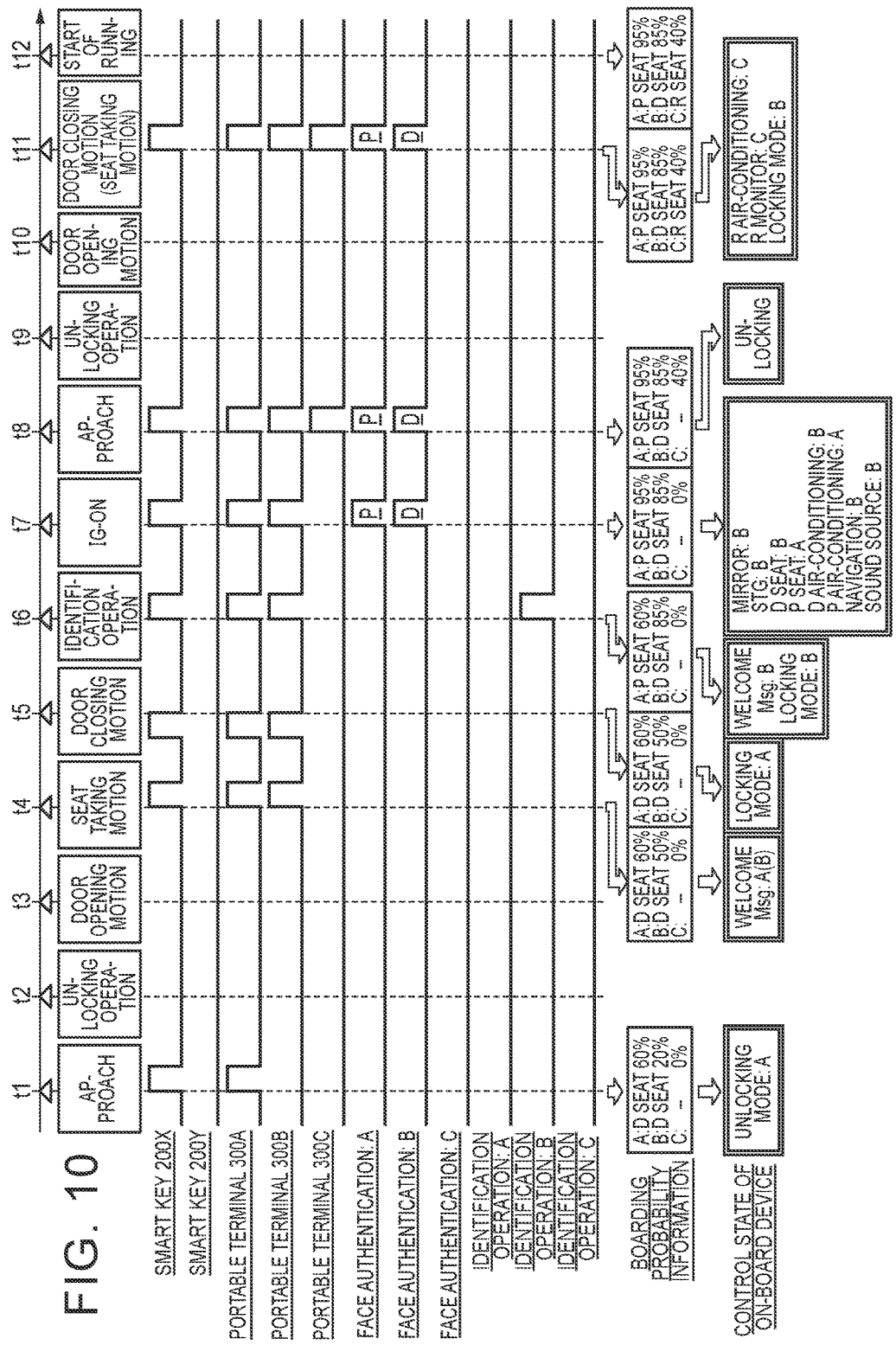
FIG. 10 is a timing chart illustrating an example of operations of the user identification system.

FIG. 10 is a timing chart illustrating an example of the operation of the user identification system 1. In this example, it is assumed that user A of users A to C which are target users first approaches the vehicle 100, unlocks a door, and takes a passenger seat, user B approaches the vehicle 100 and takes a driver seat with a time delay, and then user C takes a back seat after the vehicle 100 is subjected to IG-ON. In this example, description will be made on the premise of the profile information 7051 and the WF information 7052 illustrated in FIGS. 4 and 5.

In this example, smart keys 200 corresponding to key IDs "XXXXXX" and "YYYYYY" in the profile information 7051 illustrated in FIG. 4 are defined to be a smart key 200X and a smart key 200Y. Portable terminals 300 corresponding to BT addresses "AAAAAA," "BBBBBB," and "CCCCCC" in the profile information 7051 illustrated in FIG. 4 are defined to be a portable terminal 300A, a portable terminal 300B, and a portable terminal 300C. In this example, the weight factors based on the boarding history illustrated in FIG. 5 are to be added to user A and user C. In this example, in a state in which seat classifications are not determined, a target user having a boarding probability greater than 0% is temporarily set to a "driver seat." It is assumed that the above-mentioned mutual boarding frequency of users B and C is equal to or greater than a predetermined frequency. Between times t1 to t3 to be described later, it is assumed that the smart key 200X carried by user A who first boards the vehicle 100 is separated from the portable terminal 300B carried by user B who boards the vehicle 100 later by a distance at which Bluetooth communication is not possible.

As illustrated in FIG. 10, at time t1, the boarding/alighting motion detecting unit 702 detects user A's motion of approaching the vehicle 100 as a target motion (Y in Step S102 in FIG. 8). The information acquiring unit 703 performs a process of acquiring boarding display information when the motion of approaching the vehicle 100 is detected. At this time, since user A carries the smart key 200X and the portable terminal 300A, the information acquiring unit 703 acquires the key ID of the smart key 200X corresponding to users A and B and the BT address of the portable terminal 300A corresponding to user A. Accordingly, the boarding probability calculating unit 704 generates the boarding probability information 7053 in which the seat classification and the boarding probability for user A are set to the "driver seat" and "60%," the seat classification and the boarding probability for user B are set to the "driver seat" and "20%," and the boarding probability for user C is set to "0%," based on the WF information 7052 and the communication processing unit 701 transmits the generated boarding probability information 7053 to the on-board device ECU 80. The boarding user identification unit 802 of the body ECU 80-1 having received the boarding probability information 7053 identifies user A who is going to board the vehicle 100, and the main control unit 804 selects an unlocking mode which is preset to correspond to user A.

At time t2, the boarding/alighting motion detecting unit 702 detects user A's motion of unlocking a door. Since the body ECU 80-1 selects the unlocking mode corresponding to user A, a door of the vehicle 100 can be unlocked as details which are preset by user A (for example, only a door on which user A performs an unlocking operation is unlocked).

At time t3, the boarding/alighting motion detecting unit 702 detects user A's motion of opening a door.

At time t4, the boarding/alighting motion detecting unit 702 detects user A's motion of taking a seat as a target motion. At substantially the same time, the boarding/alighting motion detecting unit 702 detects user B's motion of approaching the vehicle 100 and user B's motion of opening a door. The information acquiring unit 703 performs a process of acquiring boarding display information when the motion of taking a seat is detected. At this time, since user A carries the smart key 200X and the portable terminal 300A and user B carries the portable terminal 300B, the information acquiring unit 703 acquires the key ID of the smart key 200X corresponding to users A and B, the BT address of the portable terminal 300A corresponding to user A, and the BT address of the portable terminal 300B corresponding to user B. Accordingly, the boarding probability calculating unit 704 generates the boarding probability information 7053 in which the seat classification and the boarding probability for user A are set to the "driver seat" and "60%," the seat classification and the boarding probability for user B are set to the "driver seat" and "50%," and the boarding probability for user C is set to "0%," based on the WF information 7052 and the communication processing unit 701 transmits the generated boarding probability information 7053 to the on-board device ECU 80. The boarding user identification unit 802 of the HMI-ECU 80-N having received the boarding probability information 7053 identifies user A who has boarded the vehicle 100 and user B who is going to board the vehicle 100. On the other hand, since the boarding user identification unit 802 of the HMI-ECU 80-N cannot determine which of users A and B has taken the driver seat, the main control unit 804 displays a note indicating that user B is detected while displaying a welcome message which is preset to correspond to user A having a high boarding probability on a display screen inside the vehicle.

At time t5, the boarding/alighting motion detecting unit 702 detects user A's motion of closing a door as a target motion. The boarding/alighting motion detecting unit 702 detects user B's motion of taking a seat and user B's motion of closing a door substantially at the same time. The information acquiring unit 703 performs a process of acquiring boarding display information when the motion of closing a door is detected. Then, the information acquiring unit 703 acquires the key ID of the smart key 200X corresponding to users A and B, the BT address of the portable terminal 300A corresponding to user A, and the BT address of the portable terminal 300B corresponding to user B. Accordingly, the boarding probability calculating unit 704 generates the boarding probability information 7053 in which the seat classification and the boarding probability for user A are set to the "driver seat" and "60%," the seat classification and the boarding probability for user B are set to the "driver seat" and "50%," and the boarding probability for user C is set to "0%," based on the WF information 7052 and the communication processing unit 701 transmits the generated boarding probability information 7053 to the on-board device ECU 80. The boarding user identification unit 802 of the body ECU 80-1 having received the boarding probability information 7053 identifies users A and B who have boarded the vehicle 100. On the other hand, since the boarding user identification unit 802 of the body ECU 80-1 cannot determine which of users A and B has taken the driver seat, the main control unit 804 selects a locking mode which is preset to correspond to user A having a high boarding probability. Accordingly, at the time of closing a door, the door of the vehicle 100 can be locked as details which are preset by user A (for example, all the doors are not locked).

At time t6, the boarding/alighting motion detecting unit 702 detects an identification operation (an operation of identifying a target user who has taken the driver seat) as a target motion. The information acquiring unit 703 performs a process of acquiring boarding display information when the identification operation is detected. At this time, since user A carries the smart key 200X and the portable terminal 300A and user B carries the portable terminal 300B, the information acquiring unit 703 acquires the key ID of the smart key 200X corresponding to users A and B, the BT address of the portable terminal 300A corresponding to user A, and the BT address of the portable terminal 300B corresponding to user B. As described above, since user B who has boarded the vehicle 100 later takes the driver seat, the information acquiring unit 703 acquires details of the identification operation indicating that user B is selected. Accordingly, the boarding probability calculating unit 704 generates the boarding probability information 7053 in which the seat classification and the boarding probability for user A are set to the "passenger seat" and "60%," the seat classification and the boarding probability for user B are set to the "driver seat" and "85%," and the boarding probability for user C is set to "0%," based on the WF information 7052 and the communication processing unit 701 transmits the generated boarding probability information 7053 to the on-board device ECU 80. The boarding user identification unit 802 of the HMI-ECU 80-N having received the boarding probability information 7053 identifies user A who takes the passenger seat of the vehicle 100 and user B who takes the driver seat of the vehicle 100, and changes the display screen inside the vehicle to a welcome message which is preset to correspond to user B. The boarding user identification unit 802 of the body ECU 80-1 having received the boarding probability information 7053 identifies user A who takes the passenger seat of the vehicle 100 and user B who takes the driver seat of the vehicle 100, and selects a locking mode which is preset to correspond to user B again. Accordingly, the doors of the vehicle 100 can be locked as details which are preset by user B (for example, all the doors are locked).

At time t7, the boarding/alighting motion detecting unit 702 detects user B's IG-ON operation on the vehicle 100. The information acquiring unit 703 performs a process of acquiring boarding display information when the IG-ON operation is detected. The information acquiring unit 703 acquires the key ID of the smart key 200X corresponding to users A and B, the BT address of the portable terminal 300A corresponding to user A, and the BT address of the portable terminal 300B corresponding to user B. When the vehicle 100 is subjected to IG-ON, the cameras 21D and 21P are started and thus the information acquiring unit 703 acquires a face image of user B as a captured image of the camera 21D and a face image of user A as a captured image of the camera 21P. Accordingly, the boarding probability calculating unit 704 generates the boarding probability information 7053 in which the seat classification and the boarding probability for user A are set to the "passenger seat" and "95%," the seat classification and the boarding probability for user B are set to the "driver seat" and "85%," and the boarding probability for user C is set to "0%" based on the WF information 7052 and the communication processing unit 701 transmits the generated boarding probability information 7053 to the on-board device ECU 80. The boarding user identification unit 802 of the body ECU 80-1 having received the boarding probability information 7053 identifies user A who have taken the passenger seat of the vehicle 100 and user B who have taken the driver seat and the main control unit 804 adjusts the steering position and the door mirror angle in accordance with the information preset to correspond to user B. The main control unit 804 of the body ECU 80-1 adjust the seat positions of the driver seat and the passenger seat based on seat position information preset to correspond to user B on the driver seat and user A on the passenger seat. The boarding user identification unit 802 of the air-conditioning ECU 80-2 having acquired the boarding probability information 7053 similarly identifies user A who have taken the passenger seat of the vehicle 100 and user B who have taken the driver seat and the main control unit 804 independently controls the air-conditioning devices on the driver seat side and the passenger seat side in accordance with an air-conditioning mode preset to correspond to user B on the driver seat and user A on the passenger seat. The boarding user identification unit 802 of the HMI-ECU 80-N having acquired the boarding probability information 7053 similarly identifies user A who have taken the passenger seat of the vehicle 100 and user B who have taken the driver seat and the main control unit 804 displays a map screen of the navigation device in a display mode preset to correspond to user B. The main control unit 804 of the HMI-ECU 80-N automatically starts reproduction of a sound source preset to correspond to user B. Accordingly, since various on-board devices for front seats (the driver seat and the passenger seat) are automatically controlled depending on the body types or tastes of users A and B, it is possible to improve convenience for target users who take the front seats.

At time t8, the boarding/alighting motion detecting unit 702 detects user C's motion of approaching the vehicle 100 as a target motion. The information acquiring unit 703 performs a process of acquiring boarding display information when the motion of approaching the vehicle 100 is detected. At this time, since user C carries the portable terminal 300C, the information acquiring unit 703 acquires the key ID of the smart key 200X corresponding to users A and B, the BT address of the portable terminal 300A corresponding to user A, the BT address of the portable terminal 300B corresponding to user B, and the BT address of the portable terminal 300C corresponding to user C. The information acquiring unit 703 acquires a face image of user B as a captured image of the camera 21D and a face image of user A as a captured image of the camera 21P. Accordingly, the boarding probability calculating unit 704 generates the boarding probability information 7053 in which the seat classification and the boarding probability for user A are set to the "passenger seat" and "95%," the seat classification and the boarding probability for user B are set to the "driver seat" and "85%," and the boarding probability for user C is set to "40%" based on the WF information 7052 and the communication processing unit 701 transmits the generated boarding probability information 7053 to the on-board device ECU 80. The boarding user identification unit 802 of the body ECU 80-1 having received the boarding probability information 7053 identifies user C of which the mutual boarding frequency with respect to user B is equal to or greater than a predetermined frequency as a target user who is going to board the vehicle 100 based on the mutual boarding frequency information 8052 (Steps S208 to S212), and the main control unit 804 sets the timer T (Step S214) as described above and waits for user C' unlocking operation (N in Step S216 and S218)

At time t9, the boarding/alighting motion detecting unit 702 detects user C's unlocking operation on the vehicle 100. Substantially at the same time, the main control unit 804 of the body ECU 80-1 detects user C's unlocking operation (Y in Step S216) and unlocks a door of the vehicle 100 (Step S220). Accordingly, since user C does not carry the smart key 200Y but the door of the vehicle 100 can be automatically unlocked, it is possible to improve convenience for user C. As for user B who has boarded the vehicle 100, it is possible to secure security due to the locking mode in which all the doors are locked and it is not necessary to perform an unlocking operation when user C whose the mutual boarding frequency is relatively high boards the vehicle, thereby securing convenience.

At time t10, the boarding/alighting motion detecting unit 702 detects user C's motion of opening a back-seat door.

At time t11, the boarding/alighting motion detecting unit 702 detects user C's motion of closing a door (a user's motion of taking a back seat) as a target motion. The information acquiring unit 703 performs a process of acquiring boarding display information when the motion of closing a back-seat door is detected. The information acquiring unit 703 acquires the key ID of the smart key 200X corresponding to users A and B, the BT address of the portable terminal 300A corresponding to user A, the BT address of the portable terminal 300B corresponding to user B, and the BT address of the portable terminal 300C corresponding to user C. The information acquiring unit 703 acquires a face image of user B as a captured image of the camera 21D and a face image of user A as a captured image of the camera 21P. Based on the motion of closing the back-seat door which is detected by the boarding/alighting motion detecting unit 702, the information acquiring unit 703 can estimate that user C has taken the back seat. Accordingly, the boarding probability calculating unit 704 generates the boarding probability information 7053 in which the seat classification and the boarding probability for user A are set to the "passenger seat" and "95%," the seat classification and the boarding probability for user B are set to the "driver seat" and "85%," and the boarding probability for user C is set to "40%" based on the WF information 7052, and the communication processing unit 701 transmits the generated boarding probability information 7053 to the on-board device ECU 80. The boarding user identification unit 802 of the body ECU 80-1 having received the boarding probability information 7053 identifies user A who takes the passenger seat, user 13 who takes the driver seat, and user C who takes the back seat, and selects the locking mode preset to correspond to user B. Accordingly, it is possible to lock the doors of the vehicle 100 again as details preset by user B (for example, all the doors are locked). The boarding user identification unit 802 of the air-conditioning ECU 80-2 having received the boarding probability information 7053 similarly identifies user A who takes the passenger seat, user B who takes the driver seat, and user C who takes the back seat, and the main control unit 804 controls the air-conditioning device of the back seat in the air-conditioning mode preset to correspond to user C. The boarding user identification unit 802 of the HMI-ECU 80-N having received the boarding probability information 7053 similarly identifies user A who takes the passenger seat, user B who takes the driver seat, and user C who takes the back seat and the main control unit 804 displays such a type of display details preset to correspond to user C on a back-seat monitor. Accordingly, since various on-board devices for the back seat are controlled depending on user C's taste, it is possible to improve convenience for a target user who has taken the back seat.

At time t12, the boarding/alighting motion detecting unit 702 detects start of running of the vehicle 100 as the ending condition (Step S116). Accordingly, the boarding probability information 7053 (that is, the boarding probability information 8051) by the process flow illustrated in FIG. 8 is determined.

The boarding probability calculating process which is performed by the user identification ECU 70 to correspond to a situation in which a target user boards or alights from the vehicle in a stopped state or a parked state after the vehicle 100 runs, that is, a situation in which a target user boards the vehicle 100 en route or alights from the vehicle 100 en route after the process flow illustrated in FIG. 8 ends will be described below with reference to FIG. 11.

Figure 11:
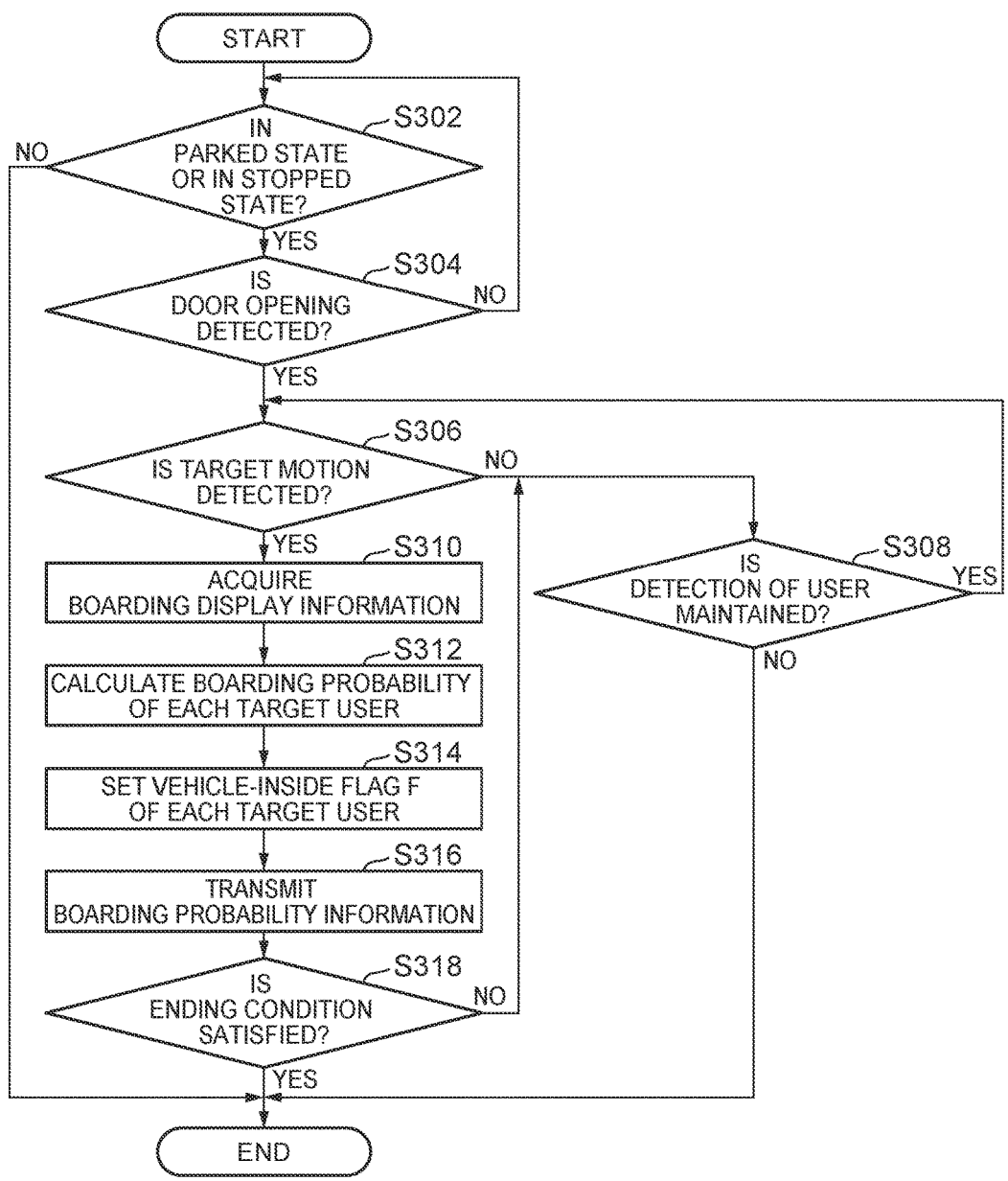
FIG. 11 is a flowchart schematically illustrating another example of the process which is performed by the user identification ECU.

FIG. 11 is a flowchart schematically illustrating another example of the boarding probability calculating process which is performed by the user identification ECU 70. The process flow in the flowchart is repeatedly performed at predetermined time intervals in a period in which the process flow illustrated in FIG. 8 is not performed.

In Step S302, the boarding/alighting motion detecting unit 702 determines whether the vehicle 100 is in a parked state (IG-OFF) or a stopped state (IG-ON). The process flow transitions to Step S304 when the boarding/alighting motion detecting unit 702 determines that the vehicle 100 in the parked state or the stopped state, and the process flow is ended otherwise.

In Step S304, the boarding/alighting motion detecting unit 702 determines whether a door opening motion is detected. The process flow transitions to Step S306 when the boarding/alighting motion detecting unit 702 determines that the door opening motion is detected, and the process flow returns to Step S302 to repeatedly perform the processes of Steps S302 and S304 otherwise.

In Step S306, the boarding/alighting motion detecting unit 702 determines whether a target motion is detected, similarly to Step S104. The process flow transitions to Step S308 when the boarding/alighting motion detecting unit 702 does not detect a target motion, and the process flow transitions to Step S310 when the boarding/alighting motion detecting unit 702 detects a target motion.

In Step 308, similarly to Step S106, the boarding/alighting motion detecting unit 702 determines whether a state in which a target user is detected is maintained, that is, whether a state in which the smart key 200 is detected by the comparison ECU 10 (the authentication processing unit 103) is maintained.

In Step S310, the information acquiring unit 703 performs a process of acquiring boarding display information, similarly to Step S108.

In Step S312, similarly to S110, the boarding probability calculating unit 704 calculates a boarding probability of each target user based on a plurality of types of boarding display information acquired by the information acquiring unit 703, the profile information 7051, and the WF information 7052.

In Step S314, similarly to Step S112, the boarding probability calculating unit 704 sets a vehicle-inside flag F corresponding to each target user.

In Step S316, similarly to Step S114, the communication processing unit 701 transmits the boarding probability information 7053, which is generated (updated) by the boarding probability calculating unit 704, to various ECUs (the on-board device ECU 80) connected thereto via the on-board network.

In Step S318, similarly to Step S116, the boarding/alighting motion detecting unit 702 determines whether the ending condition of the process flow is satisfied. For example, the boarding/alighting motion detecting unit 702 may determine whether the vehicle 100 starts running based on the detection signal received from the wheel speed sensor 60. The process flow returns to Step S308 when the boarding/alighting motion detecting unit 702 determines that the ending condition is not satisfied, and the process flow is ended when the ending condition is satisfied.

Another example of the operation of the user identification system 1 corresponding to FIGS. 9 and 11 will be described below with reference to FIG. 12.

Figure 12:
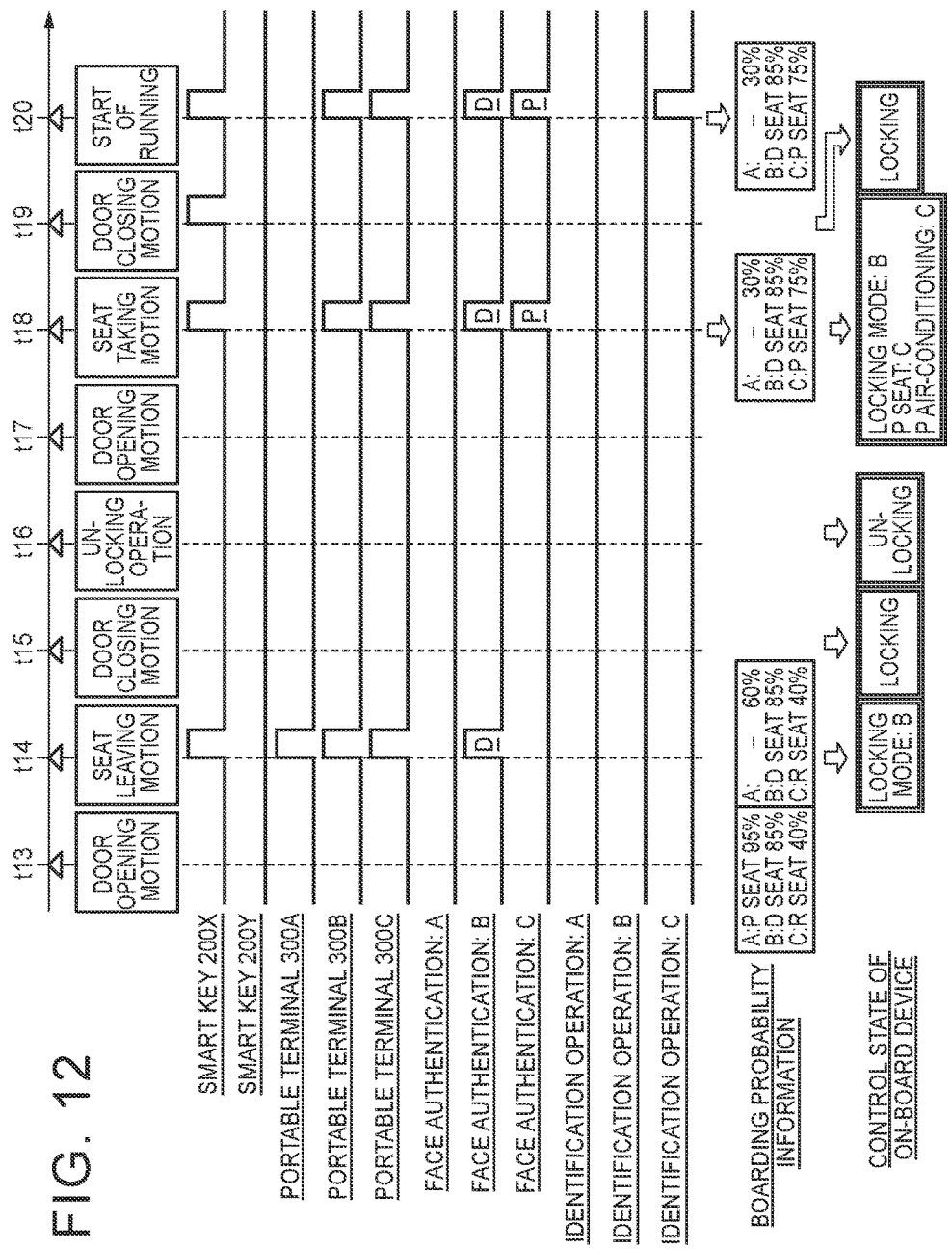
FIG. 12 is a timing chart illustrating another example of operations of the user identification system.

FIG. 12 is a timing chart illustrating another example of the operation of the user identification system 1. In this example, it is assumed that after the vehicle 100 starts running at time t12 in FIG. 10, the vehicle 100 stops en route, user A on the passenger seat among users A to C which are the target users alights from the vehicle 100, and user C on the back seat takes the passenger seat.

In this embodiment, it is assumed that when user A alights from the vehicle 100, the smart key 200X is handed over from user A to user B.

As illustrated in FIG. 12, at time t13, the boarding/alighting motion detecting unit 702 detects user A's motion of opening a passenger-seat door (Step S304) in a state in which the vehicle 100 stops (Step S302). Substantially at the same time, the boarding/alighting motion detecting unit 702 detects user C's motion of opening a back-seat door.

At time t14, the boarding/alighting motion detecting unit 702 detects user A's motion of leaving a seat as a target motion. The information acquiring unit 703 performs a process of acquiring boarding display information when the seat leaving motion is detected. At this time, user A carries the portable terminal 300A, user B carries the smart key 200X and the portable terminal 300B, and user C carries the portable terminal 300C. Accordingly, the information acquiring unit 703 acquires the key ID of the smart key 200X corresponding to users A and B, the BT address of the portable terminal 300A corresponding to user A, the BT address of the portable terminal 300B corresponding to user B, and the BT address of the portable terminal 300C corresponding to user C. Since user A leaves the passenger seat, the information acquiring unit 703 cannot acquire a face image of user A as a captured image of the camera 21P, but since user B sits on the driver seat, the information acquiring unit 703 acquires a face image of user B as a captured image of the camera 21D. Accordingly, the boarding probability calculating unit 704 generates the boarding probability information 7053 in which the boarding probability is set to "60%" for user A, the seat classification and the boarding probability are set to the "driver seat" and "85%" for user B, and the seat classification and the boarding probability are set to the "back seat" and "40%" for user C, and the communication processing unit 701 transmits the generated boarding probability information 7053 to the on-board device ECU 80. The boarding user identification unit 802 of the body ECU 80-1 having received the boarding probability information 7053 identifies user B who has taken the driver seat and user C who has taken the back seat, and the main control unit 804 selects a locking mode preset to correspond to user B as a locking mode after the doors of the vehicle 100 is closed.

Since the boarding probability of user A is 60% which is relatively high, the body ECU 80-1 may identify user A as a target user who is going to board the vehicle 100 (again) (or who has a high likelihood of alighting). The body ECU 80-1 may determine that the likelihood of alighting is high by putting emphasis on the fact that user A leaves the seat, and thus may not identify user A as a target user who is going to board the vehicle 100. In this case, when user A's motion of opening a door and motion of closing a door (or motion of taking a seat) are detected again by the boarding/alighting motion detecting unit 702, the body ECU 80-1 can identify that user A has boarded the vehicle 100.

At time t15, the boarding/alighting motion detecting unit 702 detects user A's motion of closing the passenger-seat door. Substantially at the same time, the boarding/alighting motion detecting unit 702 detects user C's motion of closing the back-seat door. Accordingly, the doors of the vehicle 100 are locked as details of the locking mode (for example, all the doors are locked) preset by user B in advance. Since the back-seat door is opened and then is closed, the boarding user identification unit 802 of the body ECU 80-1 can determine that user C is present outside the vehicle. That is, the boarding user identification unit 802 of the body ECU 80-1 identifies user C as a target user who is going to board the vehicle 100 (Steps S208 to S212) and the main control unit 804 sets the timer T as described above (Step S214) and waits for user C's unlocking operation (N in Step S216 and S218).

At time t16, the boarding/alighting motion detecting unit 702 detects user C's unlocking operation on the passenger-seat door. Substantially at the same time, the main control unit 804 of the body ECU 80-1 detects user C's unlocking operation (Y in Step S216) and unlocks the door of the vehicle 100 (Step S220). Accordingly, similarly to at time t9 in FIG. 10, since user C does not carry the smart key 200Y but the door of the vehicle 100 can be automatically unlocked, it is possible to improve convenience for user C. As for user B who has boarded the vehicle 100, it is possible to secure security due to the locking mode in which all the doors are locked and it is not necessary to perform an unlocking operation when user C whose the mutual boarding frequency is relatively high boards the vehicle, thereby securing convenience.

At time t17, the boarding/alighting motion detecting unit 702 detects user C's motion of opening a back-seat door. Substantially at the same time, the boarding/alighting motion detecting unit 702 detects user A' motion of leaving the vehicle 100.

At time t18, the boarding/alighting motion detecting unit 702 detects user C's motion of taking the passenger seat as a target motion. The information acquiring unit 703 performs a process of acquiring boarding display information when the seat taking motion is detected. At this time, since user A leaves the vehicle 100, the information acquiring unit 703 acquires the key ID of the smart key 200X corresponding to users A and B, the BT address of the portable terminal 300B corresponding to user B, and the BT address of the portable terminal 300C corresponding to user C. The information acquiring unit 703 acquires a face image of user B as a captured image of the camera 21D. Accordingly, the boarding probability calculating unit 704 generates the boarding probability information 7053 in which the boarding probability for user A is set to the "30%," the seat classification and the boarding probability for user B are set to the "driver seat" and "85%," and the seat classification and the boarding probability for user C are set to the "passenger seat" and "75%" based on the WF information 7052, and the communication processing unit 701 transmits the generated boarding probability information 7053 to the on-board device ECU 80. The body ECU 80-1 having received the boarding probability information 7053 identifies user B who takes the driver seat and user C who takes the back seat, and selects the locking mode preset to correspond to user B as a locking mode after the doors of the vehicle 100 are closed. The main control unit 804 of the body ECU 80-1 adjusts the sat position of the passenger seat based on the seat position information preset to correspond to user C on the passenger seat. The boarding user identification unit 802 of the air-conditioning ECU 80-2 having received the boarding probability information 7053 similarly identifies user B who takes the driver seat and user C who takes the back seat, and the main control unit 804 sets the air-conditioning mode for the passenger seat as details preset to correspond to user C again and independently controls the air-conditioning devices for the driver seat and the passenger seat.

At time t19, the boarding/alighting motion detecting unit 702 detects user C's motion of closing the passenger-seat door. Accordingly, the doors of the vehicle 100 are locked as details of the locking mode (for example, all the doors are locked) preset by user B.

At time t20, the boarding/alighting motion detecting unit 702 detects start of running of the vehicle 100 as the ending condition (Step S116). Accordingly, the boarding probability information 7053 by the process flow illustrated in FIG. 11 (that is, the boarding probability information 8051) is determined.

In this way, the user identification system 1 according to this embodiment includes the boarding/alighting motion detecting unit 702 that detects a plurality of target motions of a user when at least one of boarding and alighting from the vehicle 100 is performed, the information acquiring unit 703 that acquires a plurality of types (at least K types among M types) of boarding display information indicating that any of a plurality of users (target users) registered in advance in the vehicle 100 is going to board or has boarded the vehicle 100 when any one of the plurality of target motions is detected by the boarding/alighting motion detecting unit 702, the storage unit 705 that stores association information (profile information 7051) in which identification information of a plurality of users and a plurality of types (M types) of boarding display information corresponding to the plurality of users are associated with each other, the boarding probability calculating unit 704 that calculates a probability (a boarding probability) that each of the plurality of users is going to board or has boarded the vehicle 100 based on the plurality of types (at least K types among M types) of boarding display information acquired by the information acquiring unit 703 and the profile information 7051 stored in the storage unit 705, and the boarding user identification unit 802 that identifies a user who is going to board or has boarded the vehicle 100 based on the boarding probability calculated by the boarding probability calculating unit 704. That is, whenever a plurality of prescribed motions (a plurality of target motions) of a user when at least one of boarding and alighting from the vehicle 100 is performed is detected, the probability that each target user is going to board or has boarded the vehicle 100 is calculated. In general, at least one of boarding and alighting of a user is performed when occupants having boarded the vehicle 100 change. For example, when a user boards the vehicle 100 in the parked state, a series of motions such as a motion of approaching the vehicle 100, a motion of unlocking a door, a motion of opening a door, a seat taking motion, and a door closing motion are performed. For example, when a user sent to a specific place by a vehicle 100 which is driven by another use alights from the vehicle 100, a series of motions such as a door opening motion, a seat leaving motion, a door closing motion, and a motion of leaving the vehicle 100 are performed. Accordingly, when a plurality of target motions among a series of motions which are necessarily performed are performed, the boarding probabilities of the target users can be sequentially updated by calculating the boarding probabilities of the target users. Accordingly, when at least one of boarding and alighting from the vehicle 100 is performed, it is possible to provide a plurality of opportunities to identify a target user and to improve accuracy in identifying a target user who is going to board or has boarded the vehicle 100. Since the boarding probabilities of the target users are calculated whenever each of the plurality of target motions is performed, it is possible to identify a target user who is going to board or has boarded the vehicle 100 at an appropriate time for a plurality of on-board devices having different times to control a control target using information in the identified target user.

In this embodiment, a plurality of types (M types) of boarding display information include a first type of information (captured images of the cameras 21D and 21P corresponding to the driver seat and the passenger seat) which is acquired for one of a plurality of seats of the vehicle 100. Accordingly, the boarding user identification unit 802 can identify a seat classification of a user who has boarded the vehicle among a plurality of seats (the driver seat and the passenger seat) based on the captured images of the cameras 21D and 21P which are acquired by the information acquiring unit 703.

As described above, a biometric authentication sensor may be provided in each door of the vehicle 100. Accordingly, the boarding user identification unit 802 can identify a seat classification of a user who is going to board the vehicle 100 as well as the seat classification of the user who has boarded the vehicle 100. The boarding user identification unit 802 may identify a seat of a target user who has boarded the vehicle 100 based on information other than the boarding display information. For example, may identify a seat of a target user who is going to board or has boarded the vehicle 100 based on a position of a door on which a door opening motion and a door closing motion are performed by a user among all the doors of the vehicle 100. For example, when the occupant sensor 40 is a weight sensor, a target user who has taken a seat in which the occupant sensor 40 is provided may be identified by registering identification information of a plurality of users who registered in advance in the vehicle 100 and weight information of the plurality of users in the profile information 7051 in advance and comparing mass information corresponding to a detection signal of the occupant sensor 40 with the weight information in the profile information 7051.

The user identification system 1 according to this embodiment further includes the mutual boarding frequency updating unit 803 of the body ECU 80-1 that counts the mutual boarding frequencies of a plurality of users based on the identification result from the boarding user identification unit 802 and the main control unit 804 of the body ECU 80-1 that locks and unlocks of the doors of the vehicle 100. The plurality of users include a first user and a second user whose the mutual boarding frequency with respect to the first user who is counted by the mutual boarding frequency updating unit 803 is equal to or greater than a predetermined frequency. The main control unit 804 of the body ECU 80-1 unlocks the doors of the vehicle 100 when the first user is identified as a user who has boarded the vehicle 100 by the boarding user identification unit 802, the second user is identified as a user who is going to board the vehicle 100 by the boarding user identification unit 802 in a state in which the vehicle 100 is locked, and a predetermined operation on the vehicle 100 is performed from outside of the vehicle 100. Accordingly, when the second user (for example, a family member or a close friend of the first user) of which the mutual boarding frequency with respect to the first user is equal to or greater than a predetermined frequency is identified as a user who is going to board the vehicle 100 and a predetermined operation on the vehicle 100, for example, an operation of grasping a door handle, an operation of pushing a trigger switch of a door handle, or an operation in the portable terminal for transmitting a signal requesting for unlocking to the vehicle, is performed from outside the vehicle, it is possible to unlock a door to allow the second user to board the vehicle without causing the first user to perform an unlocking operation and thus to improve convenience for the first user. Even when the second user does not carry the smart key 200, the vehicle 100 can be unlocked by only performing a predetermined operation on the vehicle 100 from outside of the vehicle, thereby improving convenience for the second user. Since the first user can maintain the doors of the vehicle in a locked state while waiting for the second user, it is possible to protect himself or herself from intrusion of a malicious third party into the vehicle. That is, it is possible to achieve coexistence of security and convenience.

The main control unit 804 of the body ECU 80-1 may unlock only a door which is opened by the second user as described above. Accordingly, it is possible to further improve security. As a method of identifying the second user who is a target user who unlocks a door from the relationship with the first user, setting for permitting mutual boarding with another user (the first user) may be performed for each target user (the second user) instead of using the mutual boarding frequency. In this case, Step 208 in FIG. 9 is replaced with a process of causing the main control unit 804 to determine whether there is a target user of which setting for permitting mutual boarding with a target user who has boarded the vehicle is performed on the vehicle 100 (specifically, the user identification ECU 70 and the body ECU 80-1) in advance. Accordingly, the same operational advantages can be achieved.

The user identification system 1 according to this embodiment includes the main control units 804 of the on-board device ECUs 80-1 to 80-N that control the on-board devices mounted in the vehicle 100 depending on control conditions preset to correspond to the target user identified by the boarding user identification unit 802 among the target users. Accordingly, it is possible to control the on-board devices depending on the body type and the taste of a user who is going to board or has boarded the vehicle 100.

Second Embodiment

A second embodiment will be described below.

A user identification system 1A according to this embodiment is different from that of the first embodiment, in that a center 400A that is disposed remotely from the vehicle 100A and can mutually communicate with a vehicle 100A via a predetermined communication network 500A (for example, a mobile phone network or the Internet using a base station as a terminal) is provided. The user identification system 1A according to this embodiment is different from that of the first embodiment, in that the functions of the boarding probability calculating unit 704, the storage unit 705, and the boarding user identification unit 802 are handed over from the vehicle 100A to the center 400A. Hereinafter, the same elements as in the first embodiment will be referenced by the same reference signs and differences from the first embodiment will be mainly described.

Figure 13:
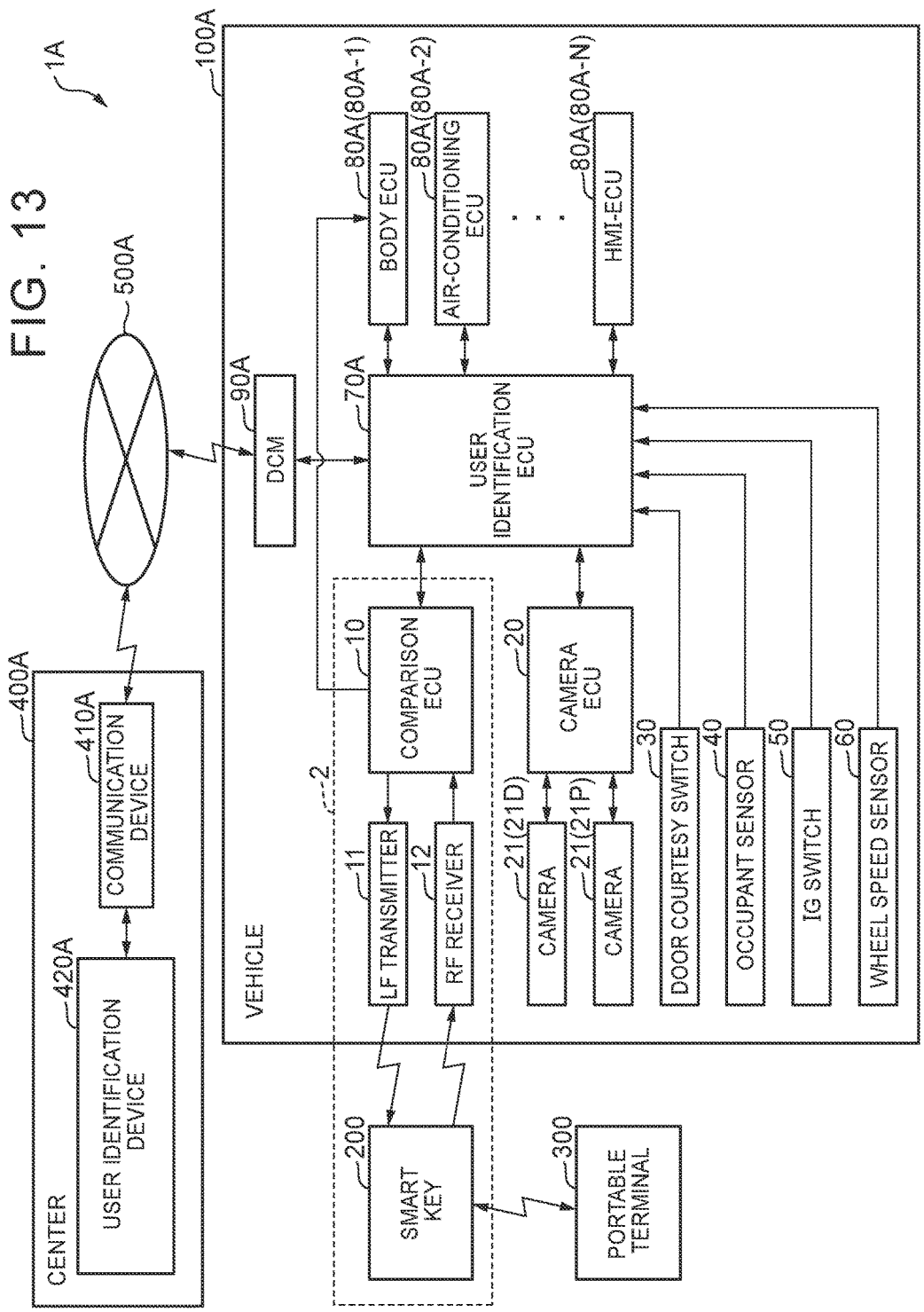
FIG. 13 is a diagram schematically illustrating an example of a configuration of a user identification system according to a second embodiment.

FIG. 13 is a block diagram schematically illustrating an example of a configuration of the user identification system 1A. Similarly to the first embodiment, the user identification system 1A identifies a user who is going to board or has boarded the vehicle 100A among a plurality of users registered in the vehicle 100A (specifically a user identification ECU 70 or an internal memory of an on-board device ECU 80 which will be described later) or the center 400A (specifically an internal memory of a user identification device 420A which will be described later). The user identification system 1A includes the vehicle 100A and the center 400A as described above.

The vehicle 100A includes a comparison ECU 10, an LF transmitter 11, an RF receiver 12, a camera ECU 20, a camera 21 (21D and 21P), a door courtesy switch 30, an occupant sensor 40, an IG switch 50, a wheel speed sensor 60, a user identification ECU 70A, an on-board device ECU 80A (80A-1 to 80A-N), and a data communication module (DCM) 90A.

Similarly to the first embodiment, the user identification ECU 70A is an electronic control unit that performs a control process of identifying a user who is going to board or has boarded the vehicle 100A. The function of the user identification ECU 70A may be embodied by arbitrary hardware, arbitrary software, or a combination thereof, and the user identification ECU 70A is mainly constituted, for example, by a microcomputer including a CPU, a RAM, a ROM, and an I/O. The functional configuration of the user identification ECU 70A will be described below with reference to FIG. 14.

FIG. 14 is a functional block diagram illustrating an example of the configuration of the user identification ECU 70A.

The user identification ECU 70A is a functional unit that is embodied, for example, by causing the CPU to execute one or more programs stored in the ROM and includes a communication processing unit 701A, a boarding/alighting motion detecting unit 702, an information acquiring unit 703, and an external communication processing unit 706A.

Similarly to the first embodiment, the communication processing unit 701A performs a process of transmitting and receiving various signals to and from various ECUs (for example, the comparison ECU 10, the camera ECU 20, and the on-board device ECU 80A) which are connected thereto via an on-board network such as a CAN. For example, similarly to the first embodiment, the communication processing unit 701A transmits a transmission command to the comparison ECU 10 in response to a transmission request from the information acquiring unit 703. For example, similarly to the first embodiment, the communication processing unit 701A receives attribute information (a key ID) of a detected smart key 200 which is transmitted from the comparison ECU 10. For example, similarly to the first embodiment, the communication processing unit 701A receives a connection state signal indicating a connection state between the detected smart key 200 and the portable terminal 300 from the comparison ECU 10. For example, similarly to the first embodiment, the communication processing unit 701A transmits an imaging request to the camera ECU 20 in response to a transmission request from the information acquiring unit 703. For example, similarly to the first embodiment, the communication processing unit 701A receives a captured image (a face image) of the camera 21 (the cameras 21D and 21P) transmitted from the camera ECU 20 having received the imaging request. For example, the communication processing unit 701A transmits boarding probability information and boarding user information which have been received from the center 400A by the external communication processing unit 706A to various ECUs (for example, the on-board device ECU 80A) connected to the on-board network in response to a transmission request from the external communication processing unit 706A.

The external communication processing unit 706A controls the DCM 90 and performs a process of transmitting and receiving various signals to and from the center 400A which is connected to be able to communicate thereto via the communication network 500A. For example, the external communication processing unit 706A transmits a plurality of types of boarding display information acquired by the information acquiring unit 703 to the center 400A in response to a transmission request from the information acquiring unit 703. The external communication processing unit 706A receives the boarding probability information and the boarding user information transmitted from the center 400A.

Referring to FIG. 13 again, the on-board device ECU 80A is an electronic control unit that controls various on-board devices which are to be controlled. The function of the on-board device ECU 80A may be embodied by arbitrary hardware, arbitrary software, or a combination thereof and the on-board device ECU 80A is mainly constituted, for example, by a microcomputer including a CPU, a RAM, a ROM, and an I/O. In this embodiment, the on-board device ECU 80A receives the boarding user information (information indicating a target user who is going to board or has boarded the vehicle 100A) transmitted from the user identification ECU 70A and controls the on-board devices based on the received boarding user information (boarding user information 8053A). The on-board device ECU 80A is connected to various ECUs (for example, the comparison ECU 10, the camera ECU 20, and the user identification ECU 70A) in a communicable manner via the on-board network such as a CAN. The on-board device ECU 80A includes a plurality of on-board device ECUs 80-1 to 80-N (N≥3).

In this example, N≥3 is set, but N=1 or N=2 may be set.

The body ECU 80A-1 is an electronic control unit that controls, for example, locking-unlocking devices of doors of the vehicle 100A, seat position adjusting devices of a driver seat and a passenger seat of the vehicle 100A, a steering position adjusting device, and a door mirror adjusting device, similarly to the first embodiment. In this embodiment, the body ECU 80A-1 controls the locking-unlocking devices, the seat position adjusting devices, and the steering position adjusting device based on the boarding user information (the boarding user information 8053A) received from the user identification ECU 70A. The body ECU 80A-1 transmits locked/unlocked state information of the doors of the vehicle 100A by the locking-unlocking devices to various ECUs via the on-board network.

The air-conditioning ECU 80A-2 is an electronic control unit that controls an air-conditioning device (not illustrated) of the vehicle 100A, and controls the air-conditioning device based on the boarding user information (the boarding user information 8053A) received from the user identification ECU 70A in this embodiment.

The HMI-ECU 80A-N is an electronic control unit that performs a control process related to an HMI function with a user of the vehicle 100A. For example, the HMI-ECU 80A-N controls an information display device that displays a variety of information on a display device inside the vehicle in addition to the navigation device and the audio device of the vehicle 100A. In this embodiment, the HMI-ECU 80A-N controls the navigation device, the audio device, the information display device, and the like based on the boarding user information (the boarding user information 8053A) received from the user identification ECU 70A.

The functional configuration of the on-board device ECU 80A will be described below with reference to FIG. 15.

FIG. 15 is a functional block diagram illustrating an example of the configuration of the on-board device ECU 80A.

The on-board device ECU 80A is a functional unit which is embodied, for example, by causing the CPU to execute one or more programs stored in the ROM, and includes a communication processing unit 801A, a mutual boarding frequency updating unit 803, and a main control unit 804A. The on-board device ECU 80A includes, for example, a storage unit 805A as a memory area which is defined in a nonvolatile internal memory such as an EEPROM.

The communication processing unit 801A performs processes associated with transmission and reception of various signals with various ECUs which are connected thereto via the on-board network such as a CAN. For example, similarly to the first embodiment, the communication processing unit 801A receives the boarding probability information transmitted from the user identification ECU 70A and stores the received boarding probability information in the storage unit 805A (the boarding probability information 8051). For example, the communication processing unit 801A receives the boarding user information transmitted from the user identification ECU 70A and stores the received boarding user information in the storage unit 805A (the boarding user information 8053A). As will be described later, since the boarding probability information and the boarding user information are generated by the center 400A and are transmitted to the on-board device ECU 80A via the user identification ECU 70A whenever the boarding/alighting motion detecting unit 702 detects a target motion, the communication processing unit 801A updates the boarding probability information 8051 and the boarding user information 8053A in the storage unit 805A whenever the boarding probability information and the boarding user information are received.

The main control unit 804A (another example of the control unit) performs a process of controlling the on-board devices (such as the locking-unlocking device, the seat position adjusting device, the steering position adjusting device, the door mirror adjusting device, the air-conditioning device, the navigation device, the audio device, and the information display device) which are to be controlled. For example, the main control unit 804A controls the on-board devices depending on a control condition (a control mode) which is set in advance to correspond to the target user who is identified as a user who is going to board or has boarded the vehicle 100A in the boarding user information 8053A. Accordingly, similarly to the first embodiment, since various on-board devices can be controlled depending on a taste, a body type, or the like of a user who is going to board or has boarded the vehicle 100A, it is possible to improve convenience for a user.

The main control unit 804A (another example of the locking-unlocking unit) of the body ECU 80A-1 performs the unlocking process illustrated in FIG. 9, similarly to the first embodiment. At this time, the processes of Steps S204, S210, and S212 (the processes which are performed by the boarding user identification unit 802) in FIG. 9 are performed by an arbitrary functional unit (for example, the main control unit 804A) in the body ECU 80A-1 based on the boarding user information 8053A. Accordingly, similarly to the first embodiment, it is possible to achieve coexistence of security and convenience.

Similarly to the first embodiment, the on-board device ECU 80A may identify a target user who is going to board or has boarded the vehicle 100A based on the boarding probability information 8051.

Referring to FIG. 13 again, the DM 90 is a communication device that can mutually communicate with the center 400A via the communication network 500A under the control of the user identification ECU 70 (the external communication processing unit 706A).

The center 400A includes a communication device 410A and a user identification device 420A.

The communication device 410A is a communication device that can mutually communicate with the vehicle 100A via the communication network 500A under the control of the user identification device 420A (a communication processing unit 421A which will be described later).

The user identification device 420A performs a process of identifying a user who is going to board or has boarded the vehicle 100A based on a plurality of types of boarding display information received from the vehicle 100A. The function of the user identification device 420A may be embodied by arbitrary hardware, arbitrary software, or a combination thereof and the user identification device 420A is mainly constituted, for example, by one or more server computers including a CPU, a RAM, a ROM, and an I/O. A functional configuration of the user identification device 420A will be described below with reference to FIG. 16.

Figure 16:
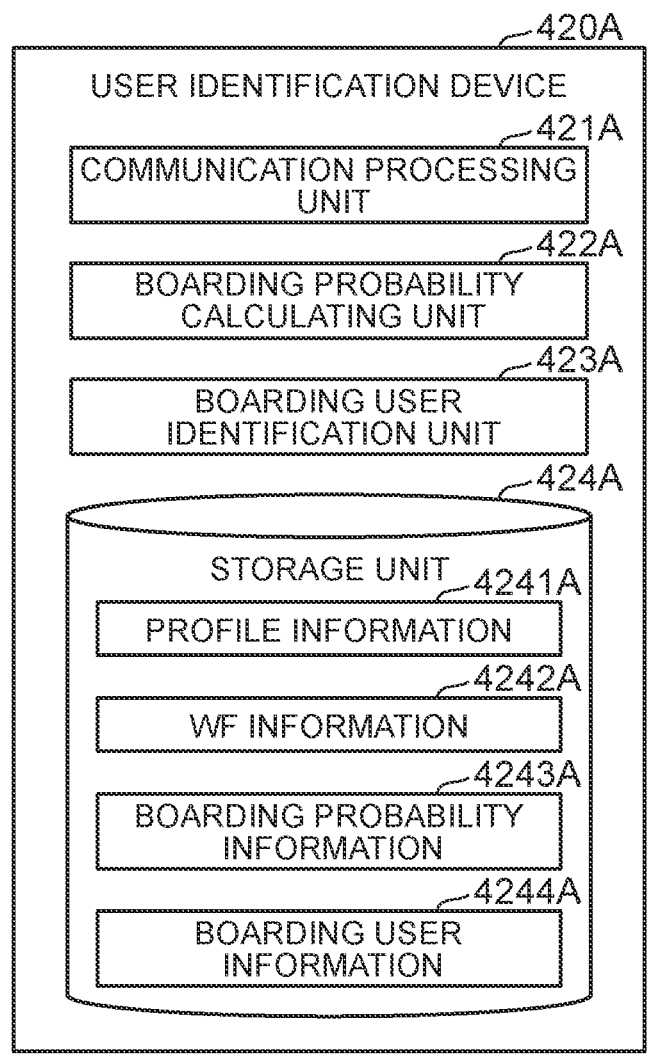
FIG. 16 is a functional block diagram schematically illustrating an example of a configuration of a user identification device according to the second embodiment.

FIG. 16 is a functional block diagram illustrating an example of a configuration of the user identification device 420A.

The user identification device 420A is, for example, a functional unit which is embodied by causing the CPU to execute one or more programs stored in the ROM, and includes a communication processing unit 421A, a boarding probability calculating unit 422A, and a boarding user identification unit 423A. The user identification device 420A includes a storage unit 424A which is a memory area which is defined in a nonvolatile storage device such as an EEPROM.

The communication processing unit 421A controls the communication device 410A and performs processes associated with transmission and reception of various signals with the vehicle 100A which is connected thereto in a communicable manner via the communication network 500A. For example, the communication processing unit 421A receives boarding display information which is transmitted from the vehicle 100A (the external communication processing unit 706A). For example, the communication processing unit 421A transmits the boarding probability information and the boarding user information to the vehicle 100A in response to the transmission request from the boarding user identification unit 423A.

Similarly to the first embodiment (the boarding probability calculating unit 704), the boarding probability calculating unit 422A (another example of the probability calculating unit) calculates boarding probabilities of target users based on a plurality of types of boarding display information received by the communication processing unit 421A, profile information 4241A and WF information 4242A stored in advance in the storage unit 424A. The profile information 4241A (another example of association information) and the WF information 4242A are the same type of information as the profile information 7051 and the WF information 7052 in the first embodiment and is, for example, information in the form of a table illustrated in FIGS. 4 and 5.

Similarly to the first embodiment, the boarding probability calculating unit 422A may estimate a target user who has boarded the vehicle 100A based on the boarding display information (information on captured images of the cameras 21D and 21P) acquired to correspond to one of a plurality of seat classifications in the boarding display information received by the communication processing unit 421A. Similarly to the first embodiment, in this embodiment, a biometric authentication sensor (for example, a fingerprint authentication sensor) may be provided in each door of the vehicle 100A, instead of or in addition to the cameras 21D and 21P. Accordingly, since the boarding probability calculating unit 422A can identify a target user who opens each door based on the detection result of the biometric authentication sensors which are received by the communication processing unit 421A, it is possible to estimate a seat classification which the target user boards.

Similarly to the first embodiment (the boarding probability calculating unit 704), the boarding probability calculating unit 422A sets a flag (a vehicle-inside flag F) indicating whether the calculated boarding probability is a probability that the target user is going to board the vehicle 100A or a probability that the target user has boarded the vehicle 100A.

The boarding probability calculating unit 422A generates boarding probability information 4243A including the calculated boarding probabilities of the target users, the estimated seat classifications, and the vehicle-inside flag F and stores (updates) the boarding probability information 4243A in the storage unit 705. The boarding probability information 4243A is the same type of information as the boarding probability information 7053 in the first embodiment and is, for example, information in the form of a table illustrated in FIG. 6.

Similarly to the first embodiment (the boarding user identification unit 802), the boarding user identification unit 423A (another example of the identification unit) identifies a target user who is going to board or has boarded the vehicle based on the boarding probability information 4243A. Similarly to the first embodiment, the boarding user identification unit 423A identifies the seat classification of the target user who is going to board or has boarded the vehicle.

The boarding user identification unit 423A generates boarding user information 4244A including information on the target user who is going to board or has boarded the vehicle and information on the seat classification of the target user, stores (updates) the generated boarding user information 4244A in the storage unit 424A, and sends a transmission request to the communication processing unit 421A. The communication processing unit 421A transmits the generated boarding user information 4244A to the vehicle 100A in response to the transmission request.

In this way, in this embodiment, the boarding probability calculating unit 422A, the boarding user identification unit 423A, and the storage unit 424A storing the profile information 4241A are disposed remotely (in the center 400A) to be able to communicate with the vehicle 100A. Accordingly, it is possible to identify a user who is going to board the vehicle 100A remotely from the vehicle 100A. Accordingly, for example, even when the vehicle 100A is not a vehicle for private of any one target user but a rental car or a shared car, it is possible to identify a target user who is going to board or has boarded the vehicle 100A and to control on-board devices depending on body types or tastes of target users. Since the vehicle 100A side does not need to perform the boarding probability calculating process and the process of identifying a target user who is going to board or has boarded the vehicle 100A, it is possible to reduce a processing load in the vehicle 100A.

In this embodiment, the boarding probability calculating unit 422A, the boarding user identification unit 423A, and the storage unit 424A are disposed remotely from the vehicle 100A, but a part or all of other functions (the functions of the boarding/alighting motion detecting unit 702 and the information acquiring unit 703) for identifying a user who is going to board or has boarded the vehicle 100A may be provided in the center 400A (the user identification device 420A). For example, when both functions of the boarding/alighting motion detecting unit 702 and the information acquiring unit 703 are provided in the center 400A, the user identification ECU 70A (the external communication processing unit 706A) transmits various signals and information which are received from the comparison ECU 10, the camera ECU 20, the door courtesy switch 30, the occupant sensor 40, the IG switch 50, and the wheel speed sensor 60 to the center 400A. When the function of the information acquiring unit 703 is provided in the center 400A and the function of the boarding/alighting motion detecting unit 702 is provided in the vehicle 100, the user identification ECU 70A (the communication processing unit 701A) transmits information on a target motion detection state of the boarding/alighting motion detecting unit 702 to the center 400A, in addition to various signals and information which are received from the comparison ECU 10, the camera ECU 20, the door courtesy switch 30, the occupant sensor 40, the IG switch 50, and the wheel speed sensor 60. In this case, the center 400A (the communication processing unit 421A) transmits various requests for the comparison ECU 10 and the camera ECU 20 for acquiring boarding display information to the vehicle 100A. Accordingly, the functions of the boarding/alighting motion detecting unit 702 and the information acquiring unit 703 can be embodied remotely from the vehicle 100 (by the center 400A).

Similarly to the first embodiment, the functions of the boarding probability calculating unit 422A and the boarding user identification unit 423A may be provided in the vehicle 100A and only the storage unit 424A in which the profile information 4241A is stored may be provided remotely from the vehicle 100A (in the center 400A). For example, when the vehicle 100A is a rental car or a shared car, the profile information 4241A and the WF information 4242A may be transmitted to the vehicle 100A in accordance with a command to the center 400A from a target user or a car rental company. Accordingly, similarly, even when the vehicle 100A is a rental car or a shared car, it is possible to identify target users who are going to board or have boarded the vehicle 100A and to control on-board devices depending on body types or tastes of the target users.

While embodiments of the present disclosure have been described above in detail, the present disclosure is not limited to a specific embodiment, but can be modified or altered in various forms within the scope of the present disclosure described in the appended claims.

In the above-mentioned embodiment, the vehicles 100 and 100A (the user identification ECUs 70 and 70A) acquire attribute information (BT addresses) of the portable terminals 300 via the smart keys 200, but a BT communication module may be mounted in the vehicles 100 and 100A and the BT addresses may be directly acquired from the portable terminals 300.

What is claimed is:

1. A user identification system comprising:
   a sensor configured to detect a plurality of prescribed motions as motions of a person when the person performs at least one of boarding and alighting from a vehicle;
   an acquisition unit configured to acquire a plurality of types of boarding information indicating that one of a plurality of users registered in the vehicle in advance boards or is on board the vehicle when one of the plurality of motions is detected;
   a memory configured to store association information in which identification information corresponding to the plurality of users is associated with the plurality of types of boarding information corresponding to the plurality of users;
   a probability calculating unit configured to calculate a probability that each of the plurality of users boards or is on board the vehicle based on the plurality of types of boarding information and the association information; and
   an identification unit configured to identify a user who boards or is on board the vehicle among the plurality of users based on the probability calculated by the probability calculating unit.

2. The user identification system according to claim 1, wherein
   the plurality of types of boarding information include a first type of boarding information which is acquired to correspond to one of a plurality of seats in the vehicle, and
   the identification unit identifies a seat of the user who boards or is on board the vehicle among the plurality of seats based on the first type of boarding information acquired by the acquisition unit.

3. The user identification system according to claim 1, further comprising
   a locking-unlocking unit configured to lock and unlock a door of the vehicle,
   wherein the plurality of users include a first user and a second user who has been set to be permitted to board the vehicle along with the first user in advance, and
   the locking-unlocking unit is configured to unlock a door of the vehicle when the first user is identified as a user who is on board the vehicle by the identification unit, the second user is identified as a user who boards the vehicle by the identification unit in a state in which all doors of the vehicle are locked, and a predetermined operation on the vehicle is performed from outside of the vehicle.

4. The user identification system according to claim 1, further comprising:
   a mutual boarding frequency counting unit configured to count a mutual boarding frequency of each pair of the plurality of users based on an identification result of the identification unit; and
   a locking-unlocking unit configured to lock and unlock a door of the vehicle,
   wherein the plurality of users include a first user and a second user, the mutual boarding frequency of the second user with the first user being equal to or greater than a predetermined frequency, and
   the locking-unlocking unit is configured to unlock the door of the vehicle when the first user is identified as a user who is on board the vehicle by the identification unit, the second user is identified as a user who boards the vehicle by the identification unit in a state in which all doors of the vehicle are locked, and a predetermined operation on the vehicle is performed from outside of the vehicle.

5. The user identification system according to claim 3, wherein
the locking-unlocking unit is configured to unlock only the door which is opened by the second user.

6. The user identification system according to claim 1, further comprising
a control unit configured to control an on-board device mounted in the vehicle based on a control condition set in advance to correspond to the user identified by the identification unit among the plurality of users.

7. The user identification system according to claim 1, wherein
the user identification system is mounted in the vehicle.

8. The user identification system according to claim 1, wherein
the memory, the probability calculating unit, and the identification unit are disposed remotely from the vehicle and configured to communicate with the vehicle.

* * * * *